United States Patent
Nienaber et al.

(10) Patent No.: US 11,959,258 B2
(45) Date of Patent: Apr. 16, 2024

(54) DEVICE FOR REMOVING A WEAR MEMBER

(71) Applicant: CQMS PTY LTD, Murarrie (AU)

(72) Inventors: Quintin Nienaber, Murarrie (AU); Ian Ashby, Murarrie (AU); David Vandersee, Murarrie (AU); Ben Plant, Murarrie (AU)

(73) Assignee: CQMS PTY LTD, Murarrie (AU)

( * ) Notice: Subject to any disclaimer, the term of this patent is extended or adjusted under 35 U.S.C. 154(b) by 62 days.

(21) Appl. No.: 17/762,596

(22) PCT Filed: Sep. 23, 2020

(86) PCT No.: PCT/AU2020/051009
§ 371 (c)(1),
(2) Date: Mar. 22, 2022

(87) PCT Pub. No.: WO2021/056061
PCT Pub. Date: Apr. 1, 2021

(65) Prior Publication Data
US 2022/0403630 A1    Dec. 22, 2022

(30) Foreign Application Priority Data
Sep. 23, 2019 (AU) .................... 2019903528

(51) Int. Cl.
*E02F 9/28* (2006.01)
*B25J 15/00* (2006.01)

(52) U.S. Cl.
CPC ......... *E02F 9/2891* (2013.01); *B25J 15/0042* (2013.01)

(58) Field of Classification Search
CPC .... E02F 9/2891; B25J 15/0028; B25B 27/026
See application file for complete search history.

(56) References Cited

U.S. PATENT DOCUMENTS

| 3,290,769 A | 12/1966 | Kashergen |
| 5,201,501 A * | 4/1993 | Fassler ............... B24B 13/0031 294/902 |

(Continued)

FOREIGN PATENT DOCUMENTS

| WO | 2011/029157 A1 | 3/2011 |
| WO | 2015/143498 A1 | 10/2015 |
| WO | 2017/218591 A1 | 12/2017 |

OTHER PUBLICATIONS

International Search Report and Written Opinion for PCT/AU2020/051009 dated Dec. 23, 2020; 11 pages.

*Primary Examiner* — Michael W Hotchkiss
(74) *Attorney, Agent, or Firm* — Schwabe, Williamson & Wyatt, PC

(57) ABSTRACT

A device for removing a wear member from a ground engaging surface, the device comprising:
 a body having cavity and a wear member engaging portion to engage the wear member when the wear member extends into the cavity;
 a gripper movable relative to the body, the gripper having a bracing member adapted to bear against a portion of the ground engaging surface to thereby provide a load path from the ground engaging surface to the wear member engaging portion; and
 a first actuator connected to the gripper and the body, to apply a force to the gripper, to urge the gripper to move relative to the body, such that, when the bracing member bears against the ground engaging surface, movement of the gripper relative to the body removes the wear member from the ground engaging surface.

12 Claims, 19 Drawing Sheets

(56) References Cited

U.S. PATENT DOCUMENTS

| | | | | |
|---|---|---|---|---|
| 6,526,641 B1* | 3/2003 | Latham | ............... | E21C 35/18 |
| | | | | 29/239 |
| 7,658,368 B2* | 2/2010 | Laun | ............... | B25C 11/02 |
| | | | | 29/270 |
| 7,891,084 B1* | 2/2011 | Sollami | ............... | E02F 9/2866 |
| | | | | 29/760 |
| 7,996,972 B2* | 8/2011 | Hu | ............... | B25B 27/026 |
| | | | | 29/259 |
| 8,181,322 B2* | 5/2012 | Lehnert | ............... | E21C 35/19 |
| | | | | 29/270 |
| 9,737,981 B2* | 8/2017 | Rowe | ............... | B25B 27/062 |
| 10,005,191 B2* | 6/2018 | Takikawa | ............... | B25J 15/12 |
| 10,988,916 B2* | 4/2021 | Paul | ............... | B25J 5/007 |
| 11,123,848 B2* | 9/2021 | Wojciechowski | ............... | B25B 27/026 |
| 11,274,423 B2* | 3/2022 | Gordon | ............... | E02F 9/2891 |
| 11,549,242 B2* | 1/2023 | Saunders | ............... | B25J 5/007 |
| 2012/0222335 A1* | 9/2012 | Charlton | ............... | E02F 9/2891 |
| | | | | 29/253 |
| 2015/0107075 A1* | 4/2015 | Clarke | ............... | B23P 19/033 |
| | | | | 29/703 |
| 2015/0151576 A1* | 6/2015 | Grengs | ............... | B60B 29/002 |
| | | | | 414/428 |
| 2017/0356167 A1* | 12/2017 | Paul | ............... | B25J 15/0491 |
| 2018/0178396 A1* | 6/2018 | Ochiishi | ............... | B25J 15/026 |
| 2019/0285151 A1* | 9/2019 | Paul | ............... | F16H 29/12 |
| 2019/0360180 A1* | 11/2019 | Carpenter | ............... | B25J 13/006 |
| 2020/0263396 A1* | 8/2020 | Clarke | ............... | E02F 9/2203 |

* cited by examiner

DEVICE FOR REMOVING A WEAR MEMBER

RELATED APPLICATIONS

The present application is a national phase entry under 35 U.S.C. § 371 of International Application No. PCT/AU2020/051009, filed Sep. 23, 2020, which claims priority to Australian provisional patent application no. 2019903528, filed Sep. 23, 2019, the entire disclosures of each of these applications are hereby incorporated by reference in their entireties and for all purposes.

FIELD

This invention relates to methods and devices for removing wear members.

BACKGROUND

Excavating equipment, such as buckets, shovels, face shovels, excavators, bucket wheel excavators, are commonly equipped with wear members, also called ground engaging tools ('GET'). The wear members, amongst other tasks, sacrificially protect the excavating equipment from the wear and tear caused by operation of the excavating equipment. In use, the wear members are exposed to the wear and tear otherwise experienced by the excavating equipment and must thus by replaced in regular or irregular intervals.

The wear members are typically mounted on a ground engaging surface of the excavating equipment and secured with a retainer. Depending on the type of excavating equipment, the wear member may be mounted on an adapter and secured with a retainer, the adapter in turn being mounted on the ground engaging surface of the excavating equipment and secured with an adapter retainer. In a similar fashion to the wear member, the adapter requires replacement in regular or irregular intervals.

The removal of the wear member and/or the adapter is a dangerous manual process due to the significant weight (often above 50 kg) of these components. Additionally, the adapter and the wear member may be wedged or unintentionally friction welded in contact zones from the forces imparted on the wear member during use. The wear member and the adapter may also be coated in dust, mud, and particulates, requiring a number of blows with a large sledge hammer to loosen up any fines ingress inside the pocket geometry.

While the removal of locking systems, i.e. retainers, is typically hammerless, the removal of the tooth or adapter from its mating part is not. Due to these circumstances significant force is often required to remove the adapter and/or the wear member, creating a potentially unsafe work environment.

SUMMARY OF INVENTION

It is an object of the invention to substantially address one or more of the problems described above, or at least provide a useful alternative to the above mentioned manual removal methods.

In a first aspect, the present invention provides a device for removing a wear member from a ground engaging surface, the device comprising:

a body having cavity and a wear member engaging portion to engage the wear member when the wear member extends into the cavity;

a gripper movable relative to the body, the gripper having a bracing member adapted to bear against a portion of the ground engaging surface to thereby provide a load path from the ground engaging surface to the wear member engaging portion; and a first actuator connected to the gripper and the body, to apply a force to the gripper, to urge the gripper to move relative to the body, such that, when the bracing member bears against the ground engaging surface, movement of the gripper relative to the body removes the wear member from the ground engaging surface.

Preferably, the wear member engaging portion is movable between:

an open position to allow movement of the wear member into the cavity, and an engaged position to engage a recess in the wear member when the wear member extends into the cavity.

Preferably, the movement of the gripper relative to the body between a first position to a second position causes the wear member engaging portion to move between the open position and the engaged position, respectively.

Preferably, the device further includes a second actuator connected between the body and the first actuator to move the gripper between the first position and the second position, and the first actuator is adapted to move the gripper between the second position and a third position, thereby, if the wear member is engaged by the wear member engaging portion, removing the wear member from the ground engaging surface.

Preferably, the second actuator moves the first actuator to move the gripper relative to the body.

Preferably, the bracing member includes a spacer adapted to bear against a side of the ground engage surface.

Preferably, the side is generally perpendicular to the portion.

Preferably, the body further includes a damping member located in the cavity to receive the wear member.

Preferably, the damping member is a resilient member biased towards the gripper.

Preferably, the resilient member is biased towards the gripper by a spring between the resilient member and the body.

Preferably, the spring extends from the resilient member away from the wear member engaging portion towards the body.

Preferably, the device is suspended from a crane, the crane being located on a utility vehicle, the utility vehicle further having a power supply;

wherein the first actuator and/or the second actuator are powered by the power supply.

Preferably, the power supply is a portable hydraulic power supply.

In a second aspect, the present invention provides a method of removing a wear member using the device of the first aspect.

In a third aspect, the present invention provides a method of removing a wear member from a ground engaging surface, the method comprising the steps of:

removing a retainer of the wear member;

positioning a device for removing the wear member in general alignment with the wear member;

moving the device towards the wear member such that the wear member abuts a resilient member position in a cavity of the device;

activating a second actuator of the device to move a set of arms positioned on a gripper of the device from an open position to an engaged position so that a gripping portion of each arm engages a recess of the wear member;

activating a first actuator to move the gripper from a second position towards a third position, thereby allowing a bracing member of the gripper to abut the ground engaging surface;

wherein movement of the gripper from the second position towards the third position is resisted by the ground engaging surface abutting the bracing member, thereby transferring a force of the first actuator to the recesses, thereby urging the wear member away and removing the wear member from the ground engaging surface.

Preferably, the method further comprises the step of:

tilting the device such that an opening of the cavity points towards a safe disposal surface.

Preferably, the method further comprises the steps of:

activating the first actuator to move the gripper from the third position to the second position; and activating the second actuator to move the set of arms from the engaged position to the open position, removing the gripping portions from the recesses.

BRIEF DESCRIPTION OF DRAWINGS

Preferred embodiments of the present invention will now be described, by way of examples only, with reference to the accompanying drawings.

DESCRIPTION OF EMBODIMENTS

Figure 1:
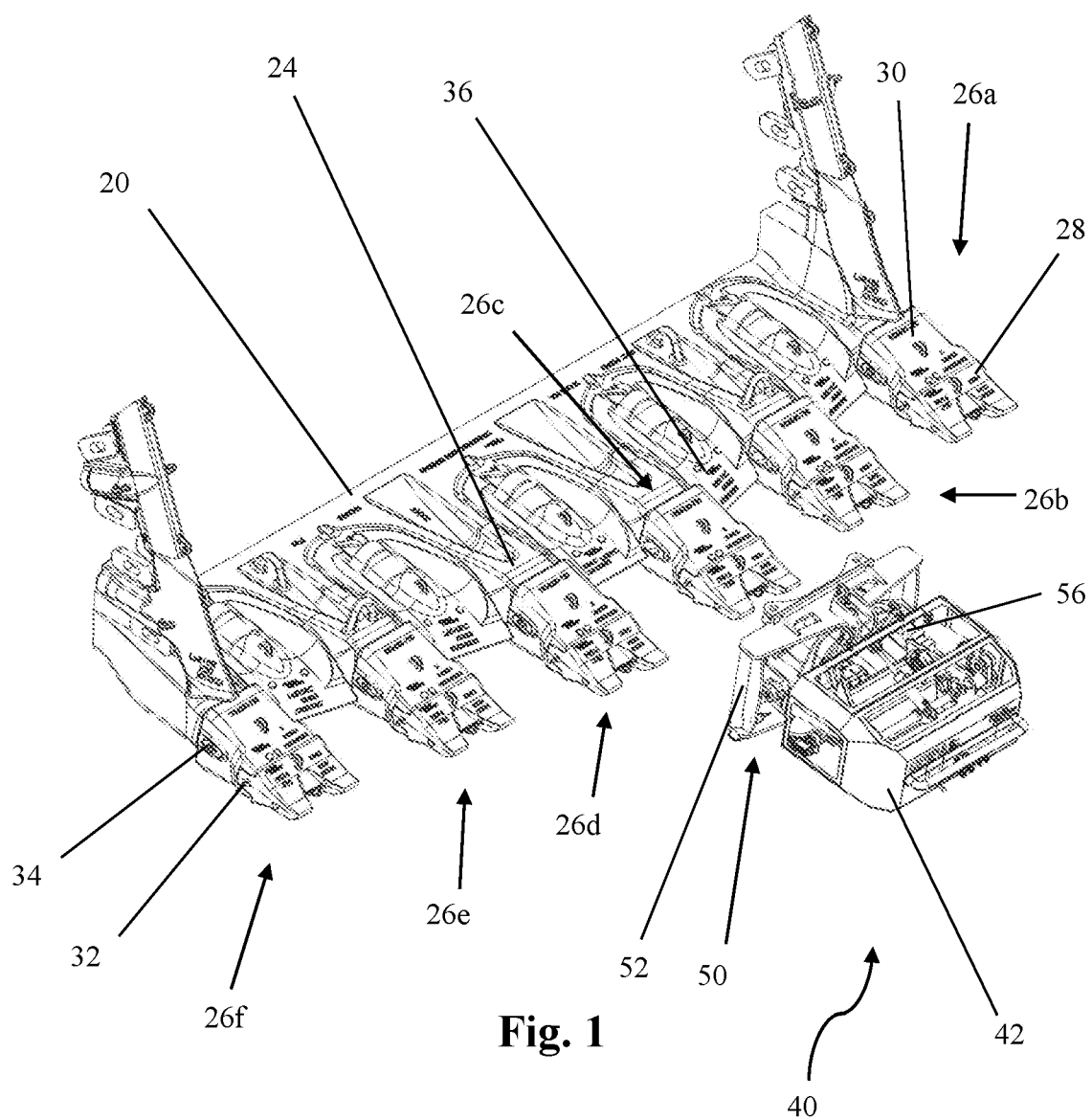
FIG. 1 is an isometric view of a wear member removal device according to a preferred embodiment of the invention.

FIG. 1 shows a ground engaging surface, in a preferred embodiment being a bucket lip 20 forming part of an excavator (not shown). The bucket lip 20 has a plurality of noses 24, each nose 24 being equipped with a wear member 26a, 26b, 26c, 26d, 26e, 26f located along the bucket lip 24. However, it would be appreciated that the wear member 26 may, for example, form part of a wheel loader, back hoe style excavator, rope shovel, dragline bucket or similar earth moving equipment instead.

Each wear member 26 may include a tooth 28 and an adapter 30, or a single piece tooth 30. The term wear member 26 throughout the specification may refer to the tooth 28, the adapter 30, a combination of the tooth 28 and the adapter 30, or a single piece tooth 30. Each tooth 28 is releasably connected to the corresponding adapter 30 with a tooth retainer 32. Each adapter 30, or single piece tooth 30, is releasably connected to the corresponding nose 24 with a retainer 34.

A further wear member, in this embodiment a number of shrouds 36, is located along the bucket lip 20, between the wear members 26.

Figure 4:
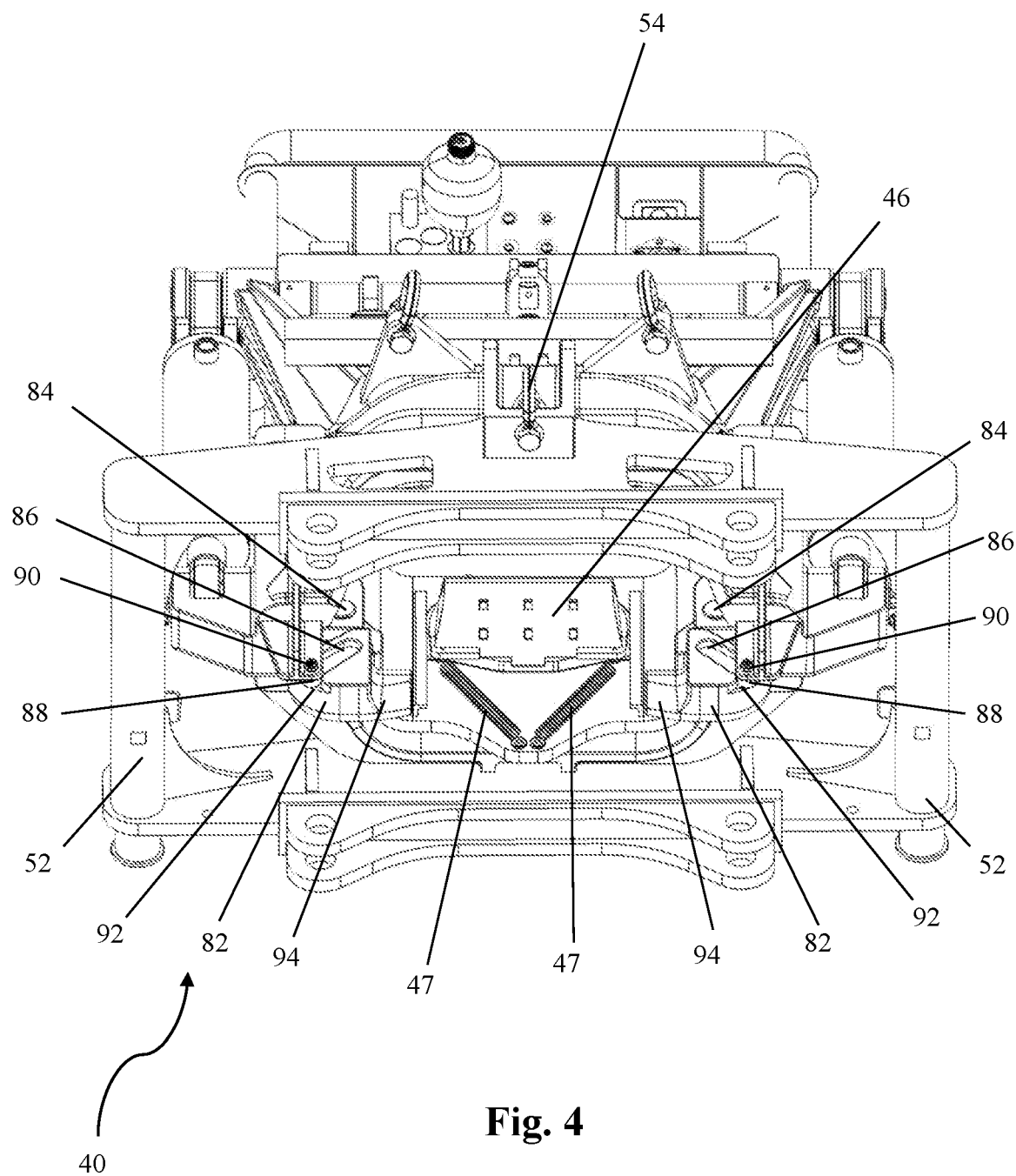
FIG. 4 is a front view of the device of FIG. 1.
Figure 5:
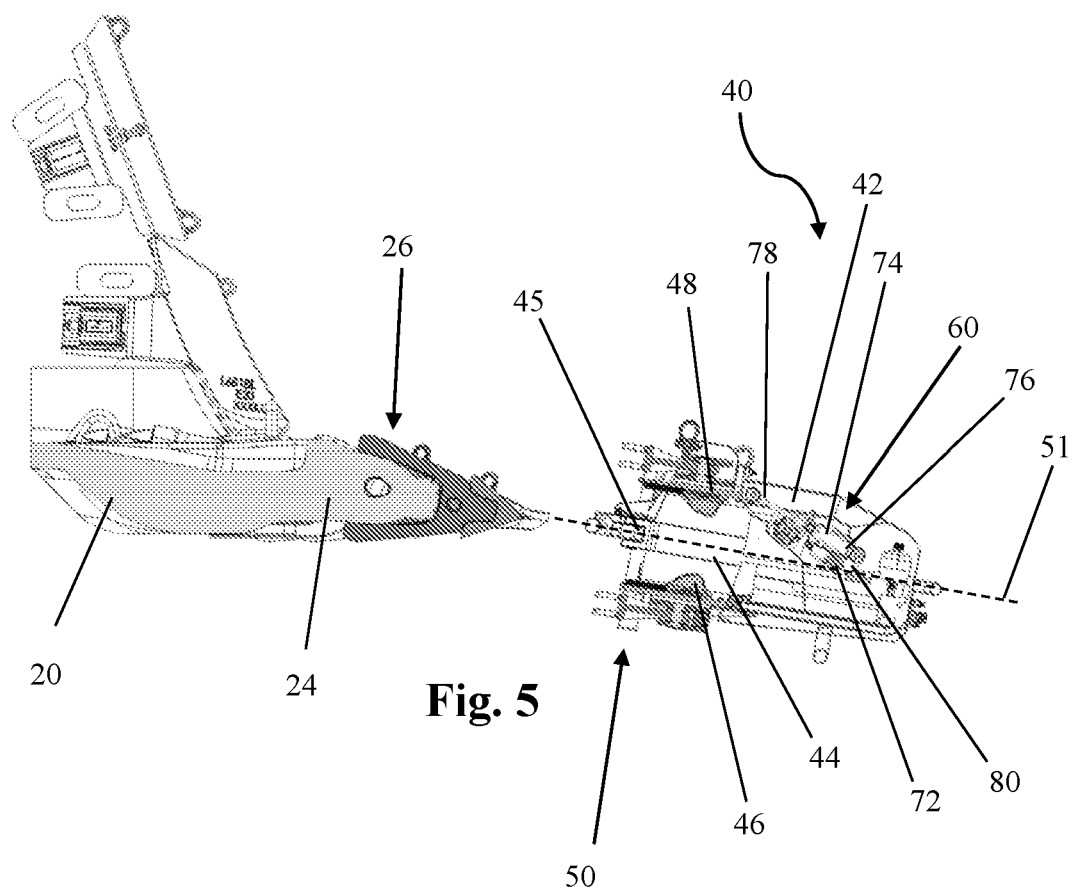
FIG. 5 is a left section view of the device of FIG. 1.
Figure 14:
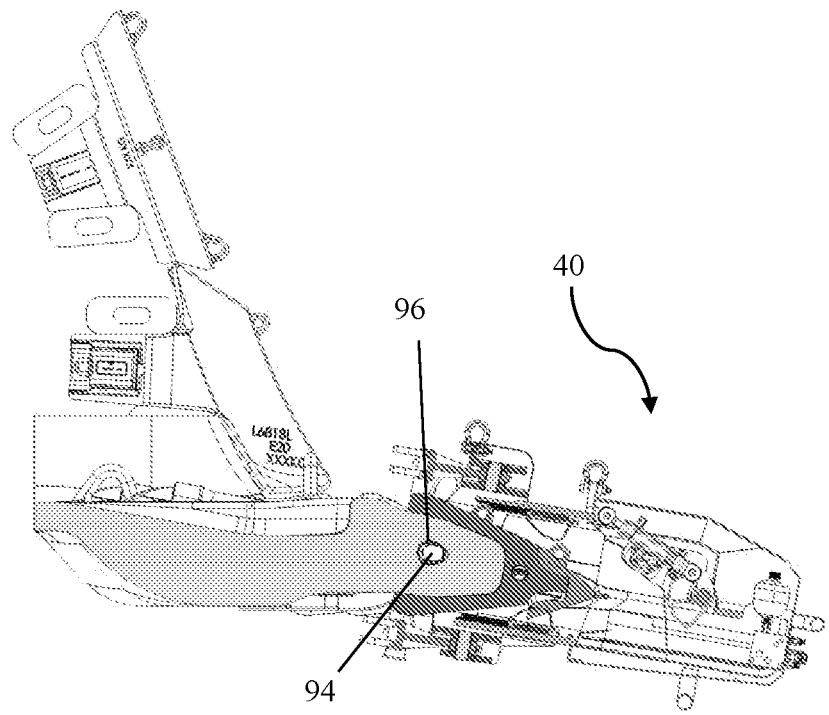
FIG. 14 is a left section view of the device of FIG. 1.
Figure 35:
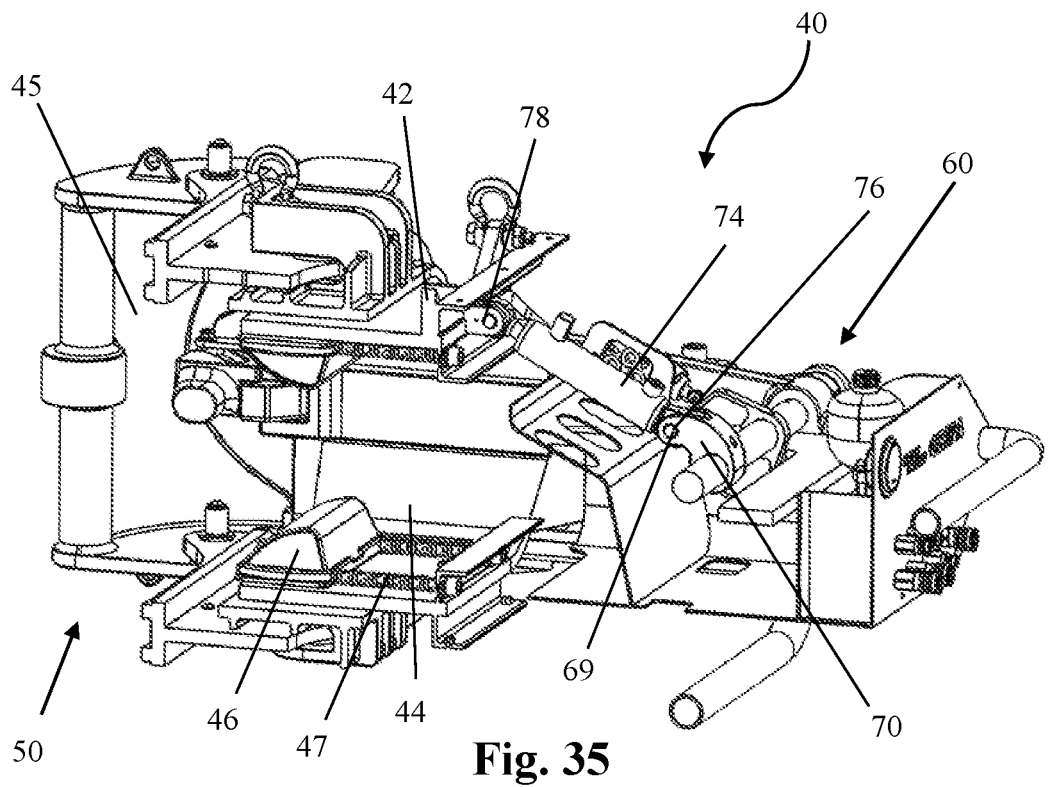
FIG. 35 is an isometric section view of a wear member removal device according to an alternative second embodiment of the invention.
Figure 36:
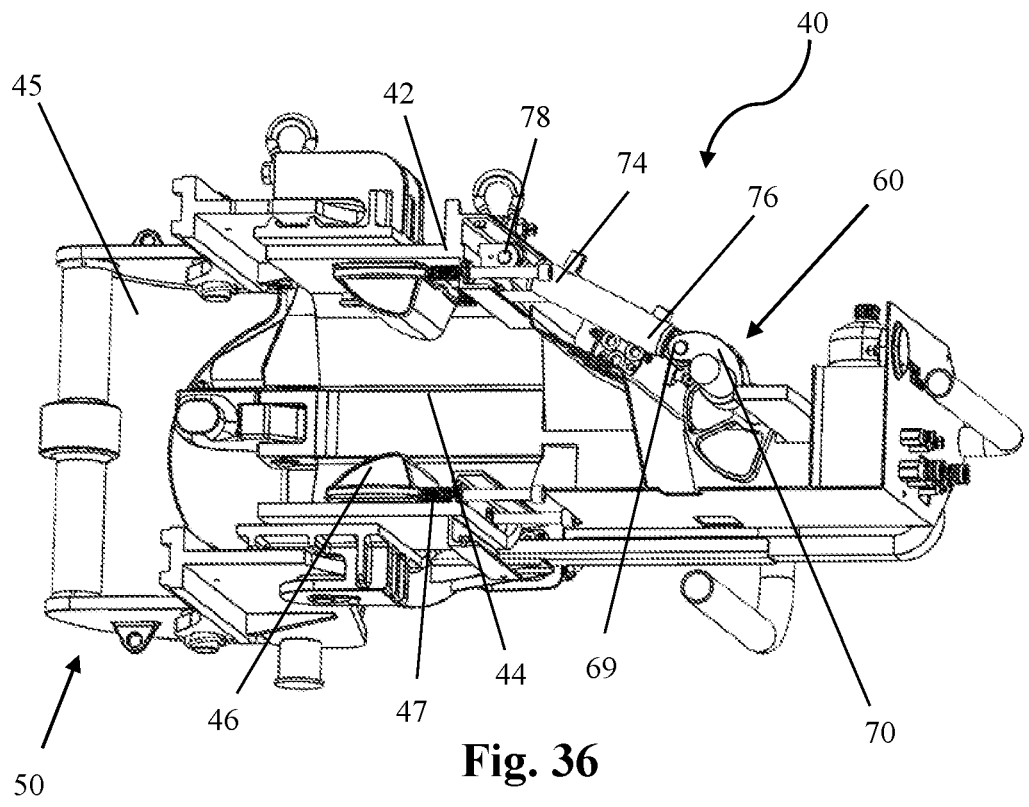
FIG. 36 is an isometric section view of the device of FIG. 35.

FIG. 1 also shows a device 40 for removing the wear member 26 from the bucket lip 20, in accordance with a preferred embodiment of the invention. As best seen in FIG. 5, the device 40 includes a body 42 having a cavity 44 with an opening 45. The device 40 also includes a damping portion, in this embodiment a resilient member 46 to frictionally engage the wear member 26 when it is inserted into the body 42. As best seen in FIG. 4, the resilient members 46 are biased towards the opening 45 by a pair of springs 47 for each resilient member 46. In the embodiment shown in FIG. 4, the springs 47 are mounted between the opening 45 and the resilient member 46, so as to act in tension when the wear member 26 engages the resilient members 46, as shown in FIG. 14. In an alternative and preferred embodiment shown in FIG. 35, the springs 47 are located between the resilient member 46 and a portion of the body 42 away from the opening, so as to act in compression when the wear member 26 engages the resilient members 46, as shown in FIG. 36.

Returning to FIG. 5, the body 42 also has a guide structure 48 movably supporting a gripper 50, so that the gripper 50 is movable relative to the body 42 along a gripper axis 51.

Figure 2:
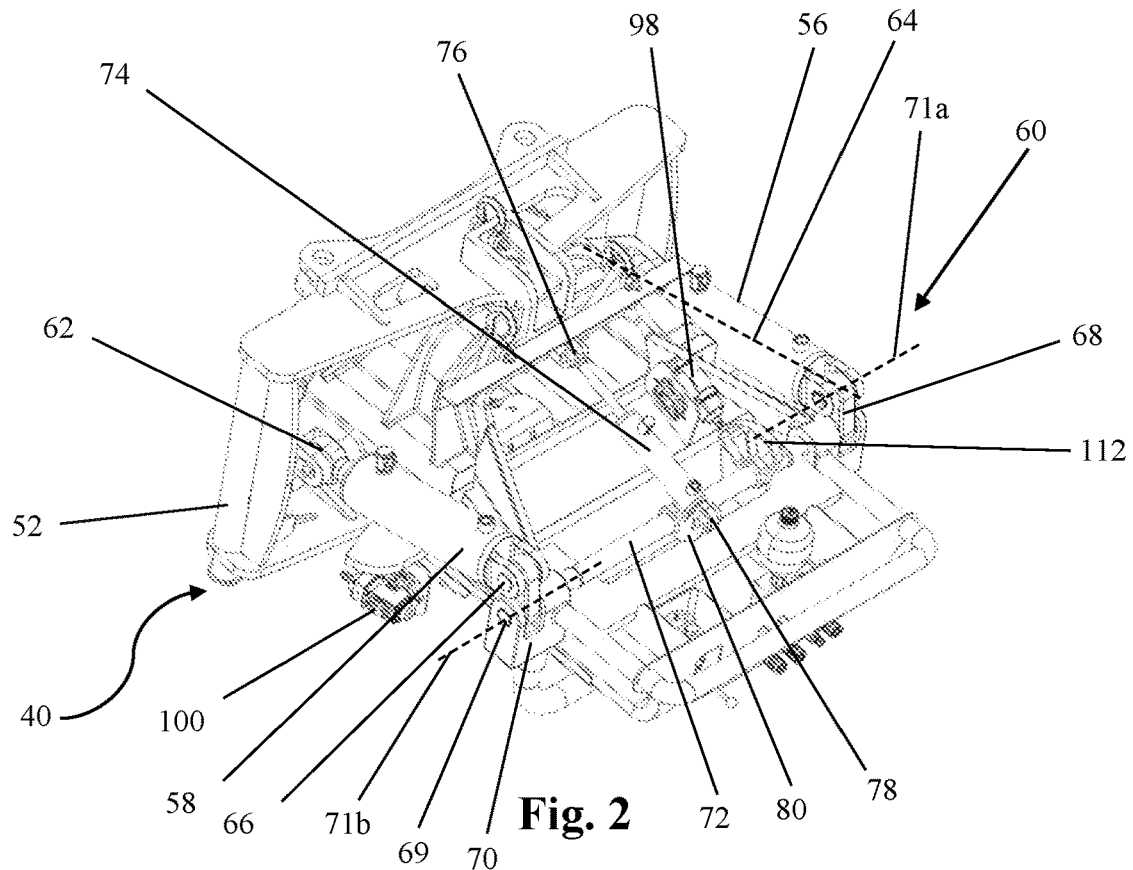
FIG. 2 is a left view of the device of FIG. 1.
Figure 7:
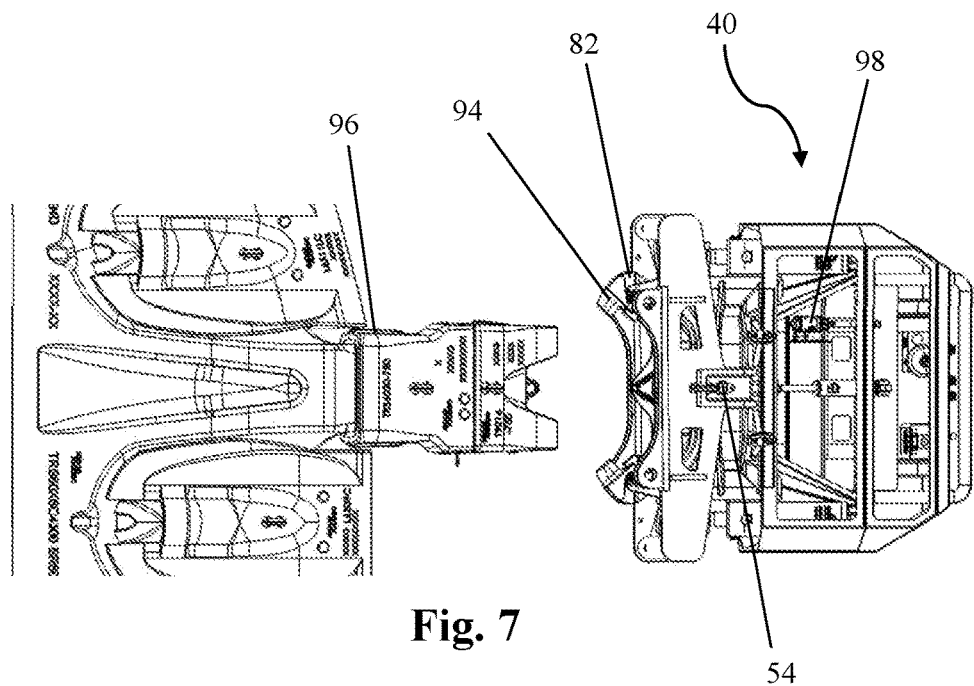
FIG. 7 is a top view of the device of FIG. 1.

As shown in FIG. 7, the gripper 50, in turn, has a bracing member, in this embodiment a pair of bracing bars 52 connected to the gripper by a bracing bar pin 54. The bracing bars 52 are movable between a first position, shown in FIG. 7, and a second position, shown in FIG. 16. The bracing bars 52, in the second position, abut the shrouds 36 adjacent the wear member 26 to bear against the shroud 36 that forms a portion of the ground engaging surface. As best seen in FIG. 2, a first actuator 56 is pivotally connected, at a proximal end 58 to a pivoting linkage 60 that is attached to the body 42, and a distal end 62, to the gripper 50. The first actuator 56 is movable between a first position, shown in FIGS. 2 and 10, and a second position, shown in FIGS. 3 and 13, thereby moving the gripper 50 between a first position and a second position. The first actuator 56 is also movable between along a first actuator axis 64 between the second position and a third position, shown in FIG. 16, thereby moving the gripper 50 between the second position and a third position. When moving between the second position and the third position, the first actuator axis 64 is generally parallel to the gripper axis 51.

Figure 3:
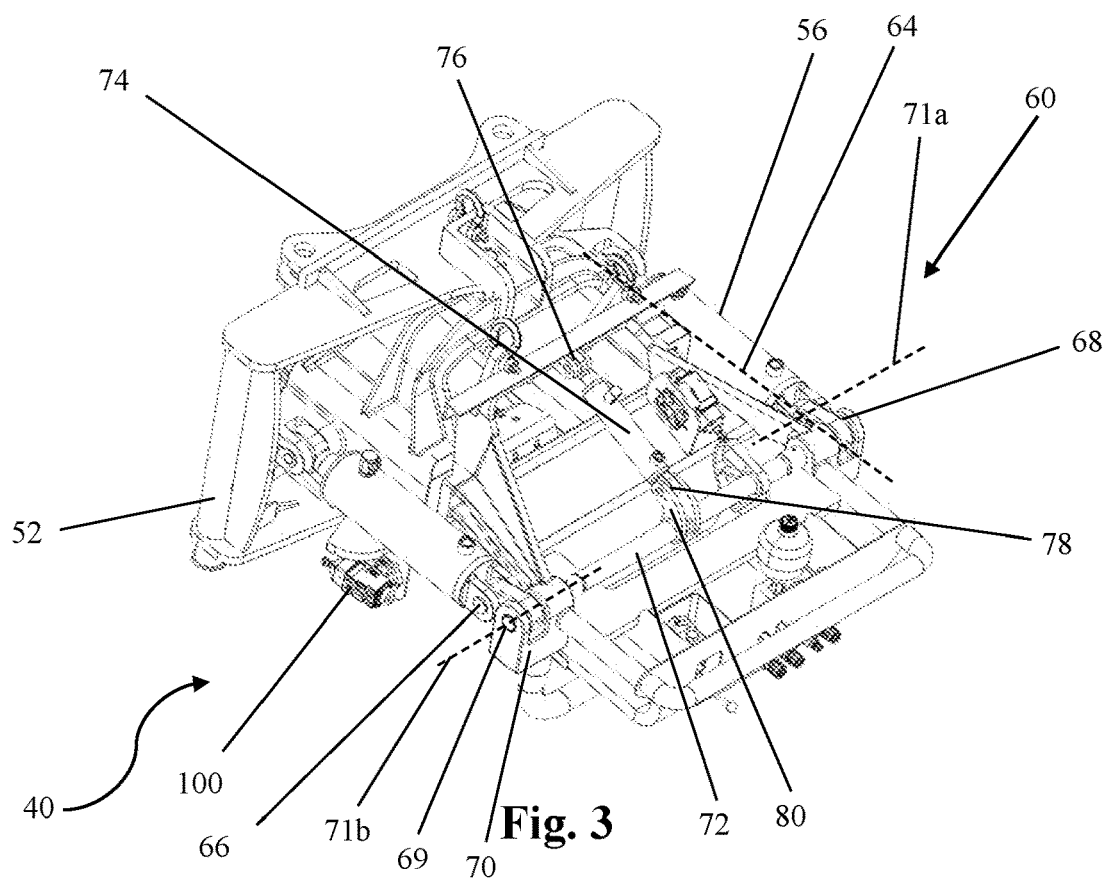
FIG. 3 is a left view of the device of FIG. 1.

As best seen in FIGS. 2 and 3, the pivoting linkage 60 includes a first actuator pin 66 located at the proximal end 58. A strut 68 is pivotably connected to the first actuator pin 66 at a first end, and pivotably connected to a lever arm pin 69 on a lever arm 70 at a second end. The first actuator pin 66 and the lever arm pin 69 each have a pin axis 71a, 71b, respectively. The pin axes 71a, 71b are generally parallel to each other and generally perpendicular to the first actuator axis 64.

The clamp 70 is mounted on a shaft 72. The shaft 72 is pivotable between a first position, shown in FIG. 2, and a second position, shown in FIG. 3. A second actuator 74 is connected, at a first end 76, to the body 42 and, at a second end 78 to a second lever arm 80 that extends from the shaft 72. Thus, a linear force applied by the second actuator 74 to the second lever arm 80 is able to pivot the shaft 72 between the first position and the second position, thereby causing the first actuator 56 to move between the first position and the second position.

Figure 10:
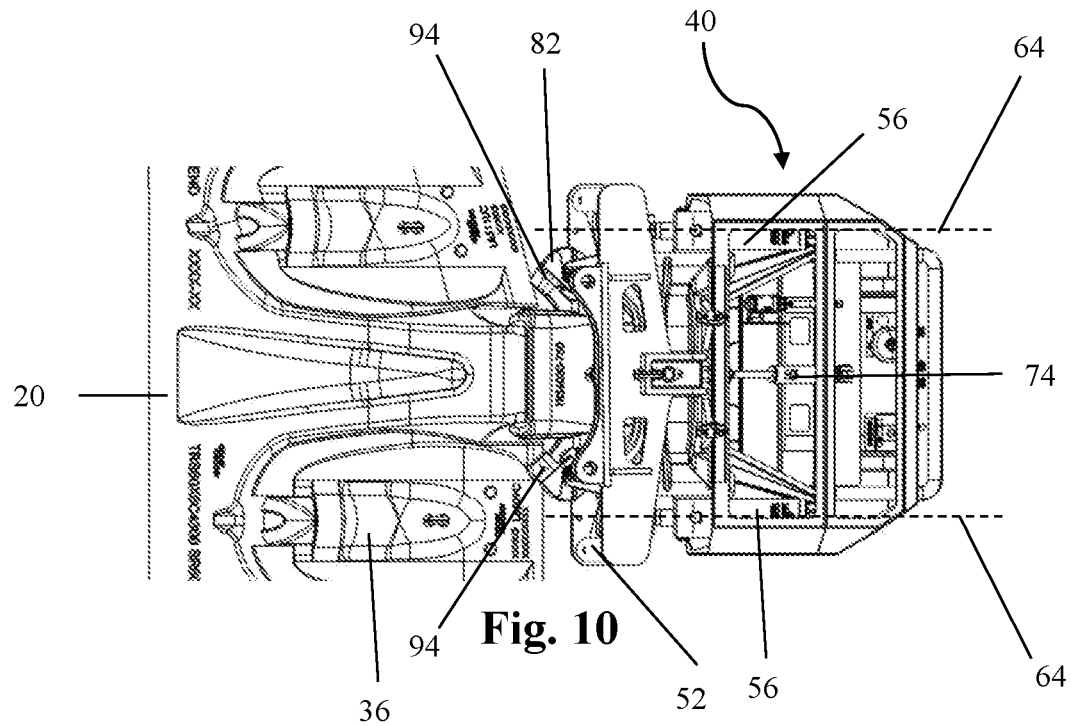
FIG. 10 is a top view of the device of FIG. 1.
Figure 11:
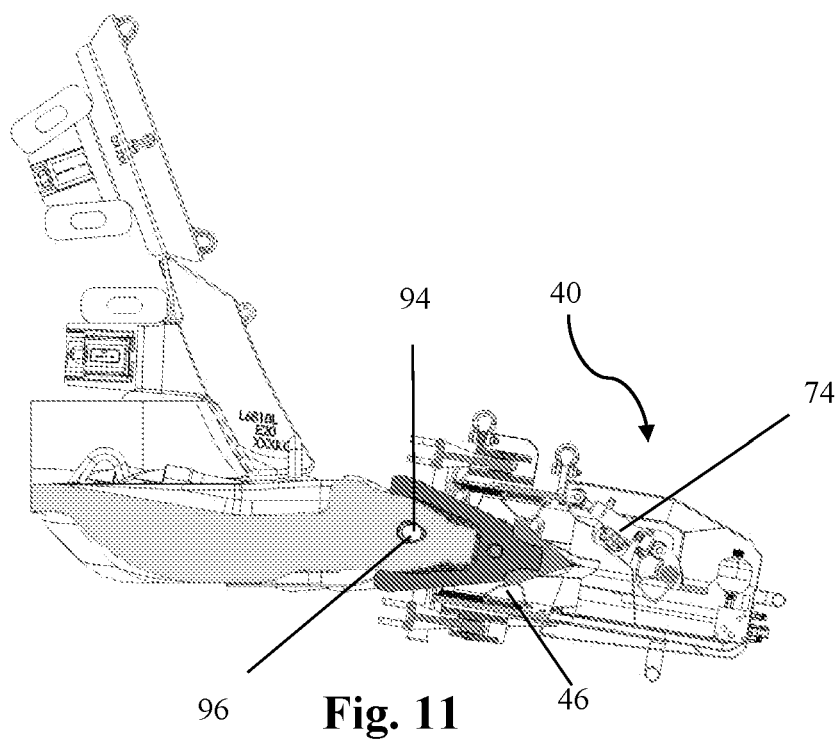
FIG. 11 is a left section view of the device of FIG. 1.
Figure 13:
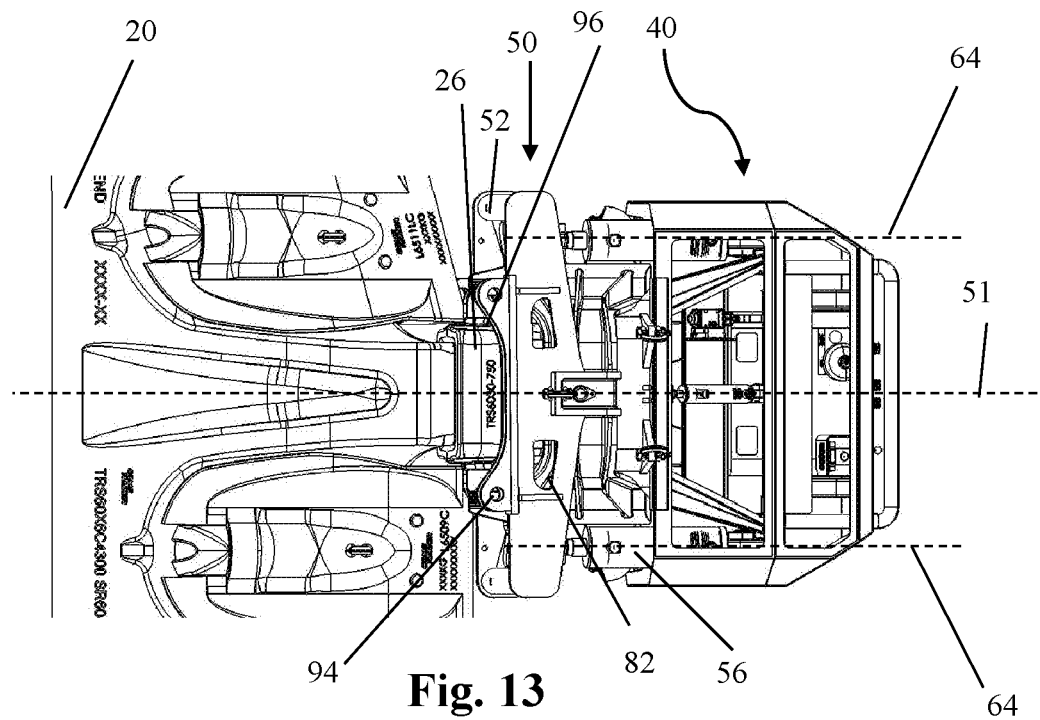
FIG. 13 is a top view of the device of FIG. 1.

As shown in FIG. 4, the device 40 further includes a pair of wear member engaging portions, in this embodiment a pair of arms 82, each mounted on an arm pin 84 so as to be pivotable between an open position, to allow movement of the wear member 26 into the cavity 44 as shown in FIG. 10, and an engaged position, shown in FIG. 13 to engage the wear member 26 when the wear member 26 is located in the cavity 44, thereby providing a load path from the ground engaging surface to the arm pin 84 to the wear member 26. Each arm 82 has a curved slot 86 that receives a roller 88, the roller 88 being mounted on a roller pin 90 extending from the body 42. Each curved slot 86 is curved, or slanted, such that a distance between the slot 86 to the gripper axis 51 increases with distance from the body 42. Each slot 86 ends in a distal opening 92.

Each arm 82 has a gripping portion 94 at an end thereof, each gripping portion 94 being adapted to engage a recess 96, shown in FIG. 7, in the wear member 26.

Returning to FIG. 2, the device 40 also includes a first sensor 98 mounted to the body 42. The first sensor 98 is adapted to provide a first signal to a controller (not shown) indicating that the first actuator 56 is in the first position by determining a rotational position of a cam 112 that is fixed to the shaft 72. The device 40 further includes a second sensor 100 mounted to the body 42. The second sensor 100 is adapted to provide a second signal to the controller indicating that the bracing bars 52 are within their operational movement limit, i.e. to indicate when the bracing bars 52 are in danger of making contact with the body 42.

Figure 32:
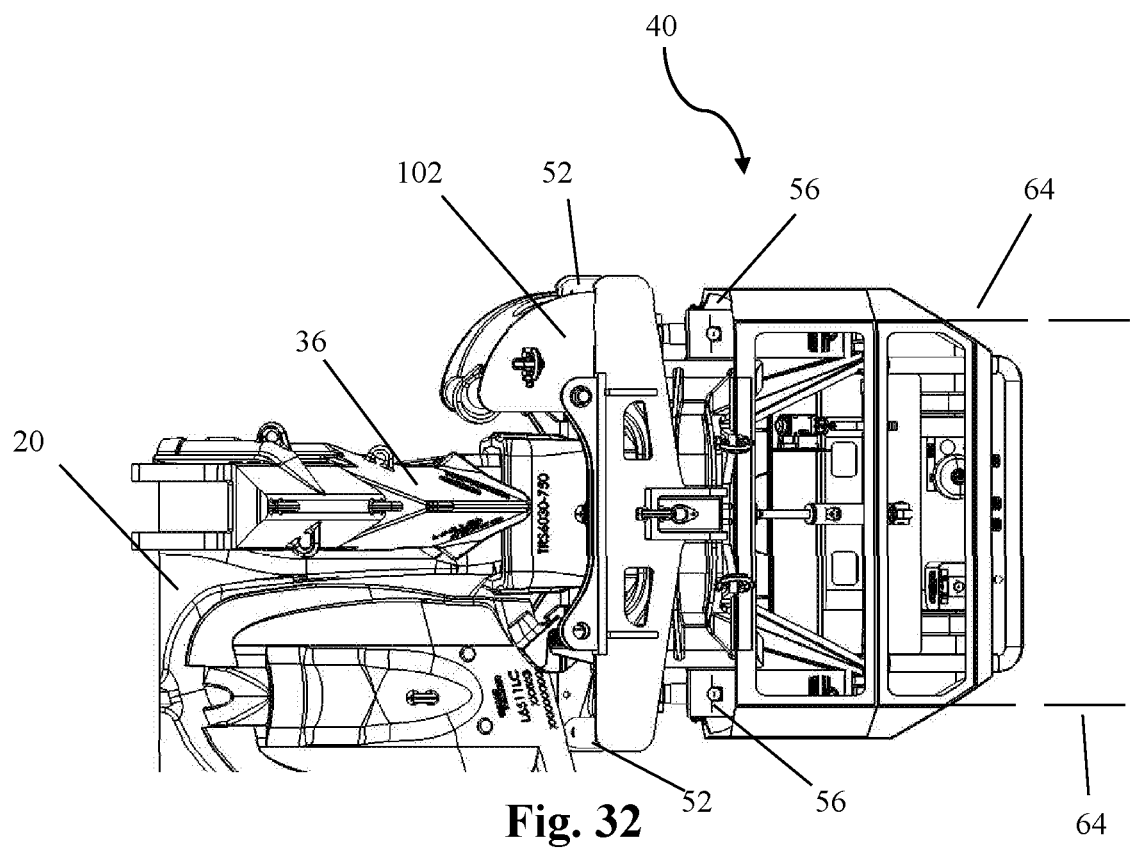
FIG. 32 is a top view of a wear member removal device according to a second embodiment of the invention.
Figure 33:
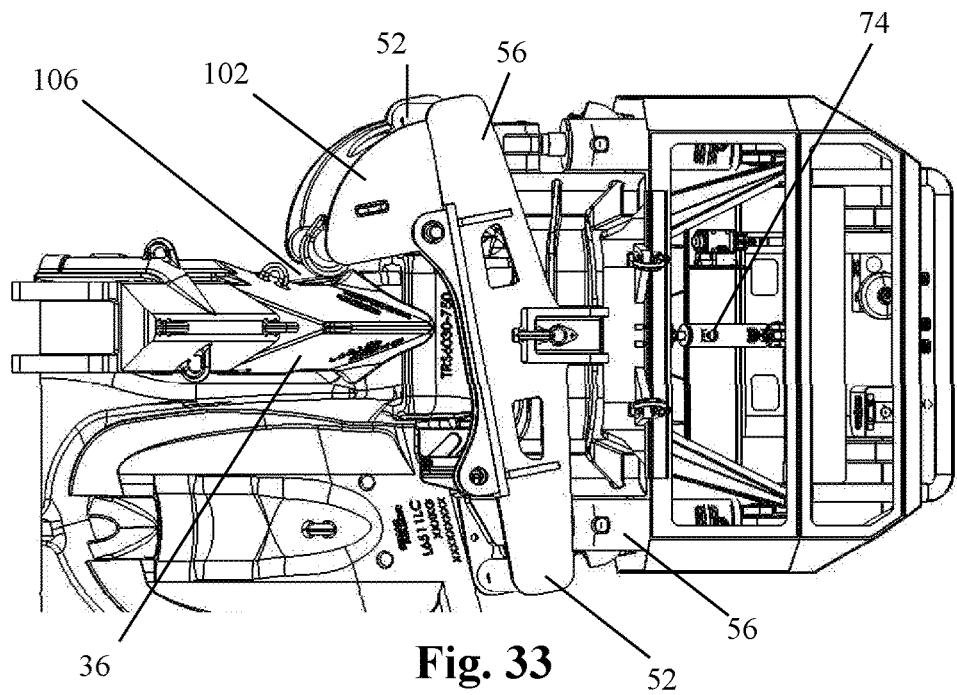
FIG. 33 is a top view of the device of FIG. 32.
Figure 34:
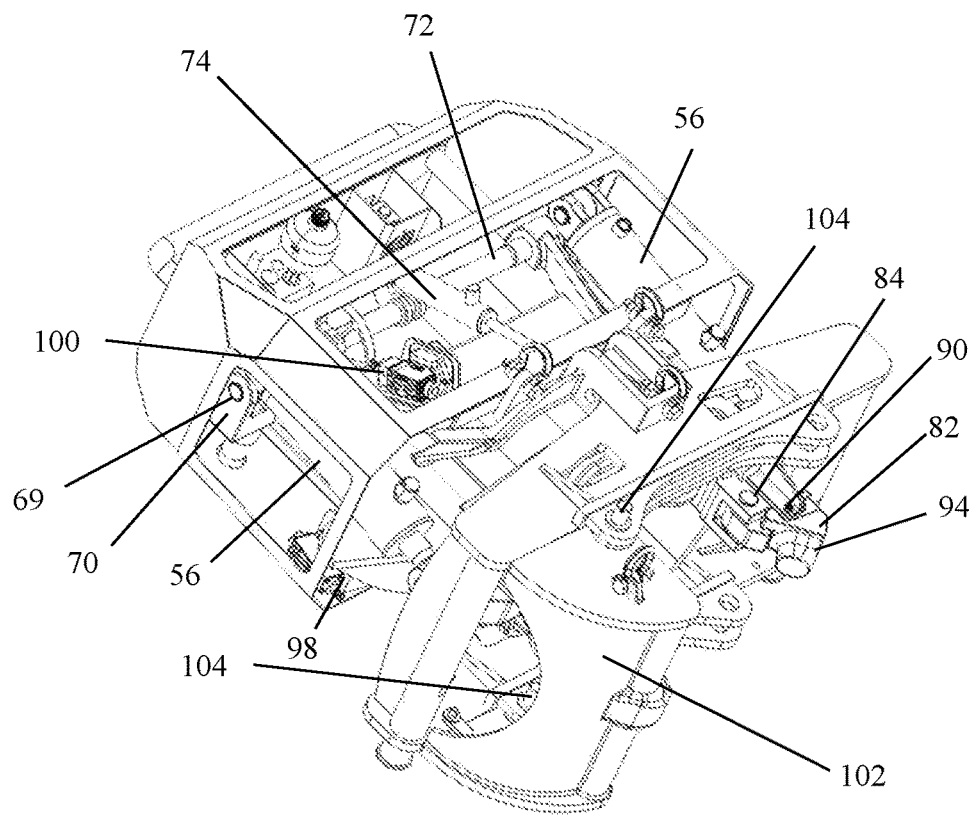
FIG. 34 is an isometric view of the device of FIG. 32.

In a second embodiment, shown in FIGS. 32-34, the device 40 includes a spacer 102 connected to the bracing bars 52 by a spacer pin 104. The spacer 102 is adapted to bear against a side 106 of the bucket lip 20, or a shroud 36 attached to the side 106, when the bracing bars 52 are in the second position. The side 106 is generally perpendicular to the portions of the bucket lip 20 that are covered by the shrouds 36.

The device 40 may be suspended from a portable crane (not shown), or similar manipulator, the crane being located on a utility vehicle (not shown), the utility vehicle further having a power supply (not shown) including a hydraulic, pneumatic, and/or electric supply. The first actuator 56 and/or the second actuator 74 are powered by the power supply.

Use of the device 40 will now be discussed.

To remove a wear member 26 from a nose 24, the tooth retainer 32 may optionally be removed from the wear member 26. However, preferably, the wear member 26 may be removed wholly. A user of the device 40 ensures that the first actuator 56 is in the first position, and that the arms 82 are in the open position, by moving the second actuator 74 to the first position. The user also removes the retainer 34.

Figure 8:
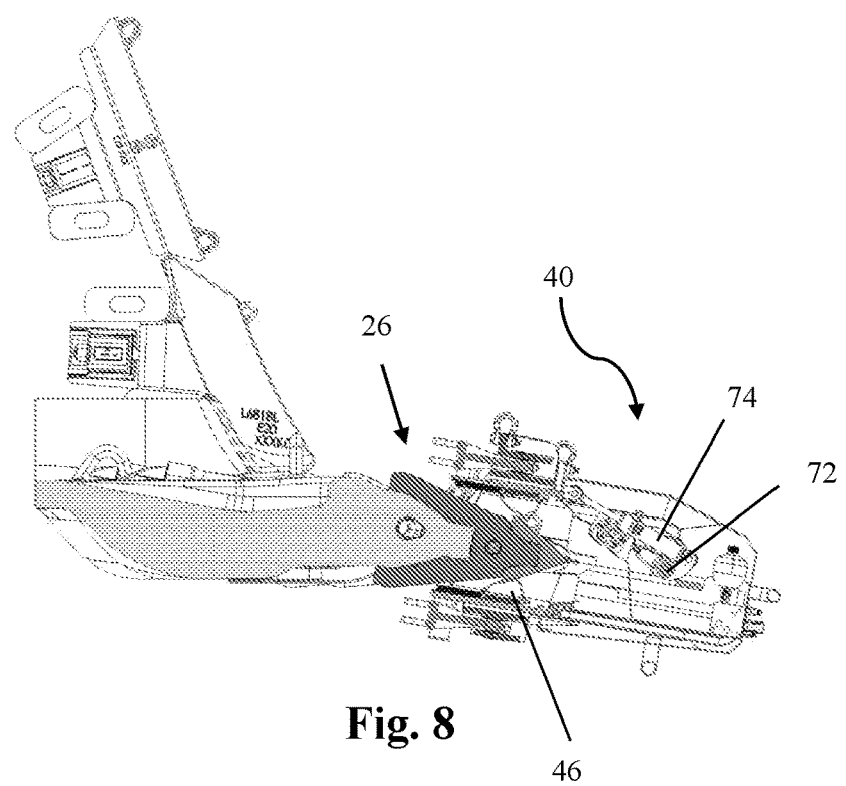
FIG. 8 is a left section view of the device of FIG. 1.
Figure 9:
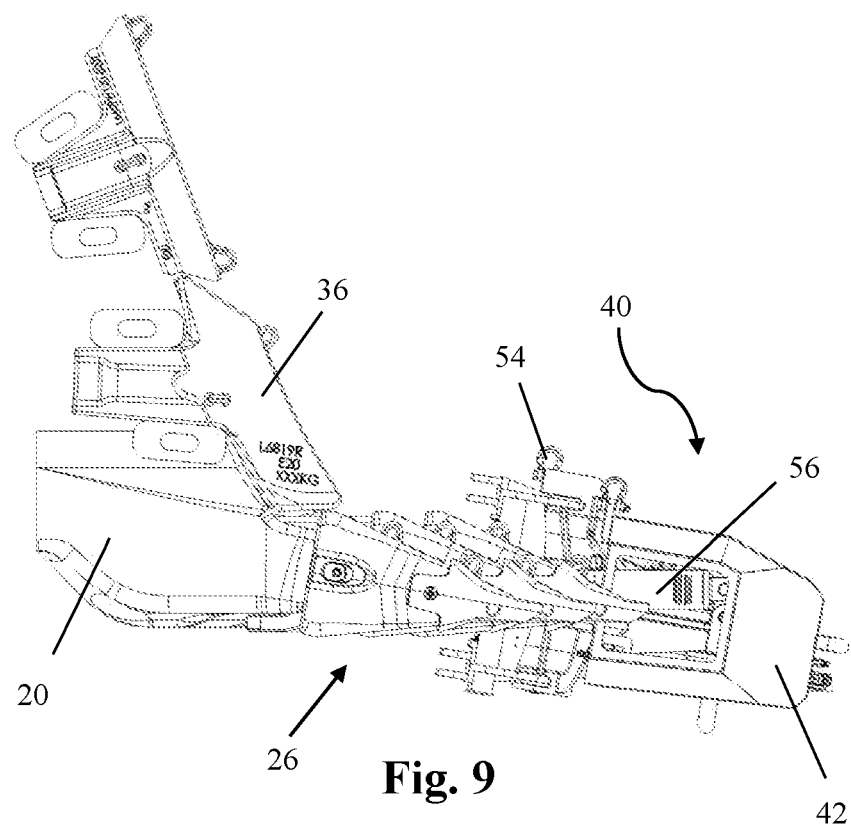
FIG. 9 is a left view of the device of FIG. 1.
Figure 12:
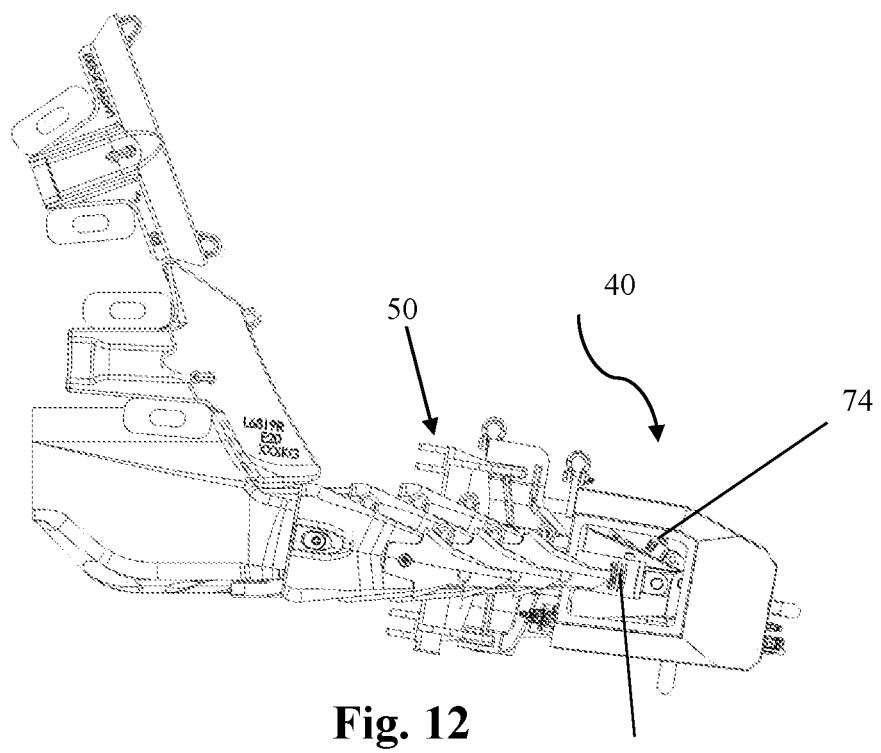
FIG. 12 is a left view of the device of FIG. 1.

The device 40 is then positioned in general alignment with the wear member 26, as shown in FIG. 5, suspended using a first shackle 108 and a second shackle 110. The device 40 is subsequently moved towards the wear member 26 so that the wear member 26 abuts the resilient member 46, as shown in FIGS. 8 and 9, the resilient member 46 aiding to absorb the impact and to center the wear member 26 within the cavity 44. The second actuator 74 is then activated so that the shaft 72 is pivoted from the first position to the second position, thereby moving the first actuator 56 from the first position to the second position, as shown in FIG. 12. The movement of the first actuator 56 from the first position to the second position translates the gripper 50 relative to the guide structure 48 along the gripper axis 51, as seen in FIG. 13. The roller 88 mounted to the gripper 50 moves along the curved slot 86 as the gripper 50 is translated along the gripper axis towards the bucket lip 20, thereby urging the arms 82 from the open position to the engaged position so that the gripping portions 94 engage the recesses 96 of the wear member 26, as shown in FIG. 14.

Figure 15:
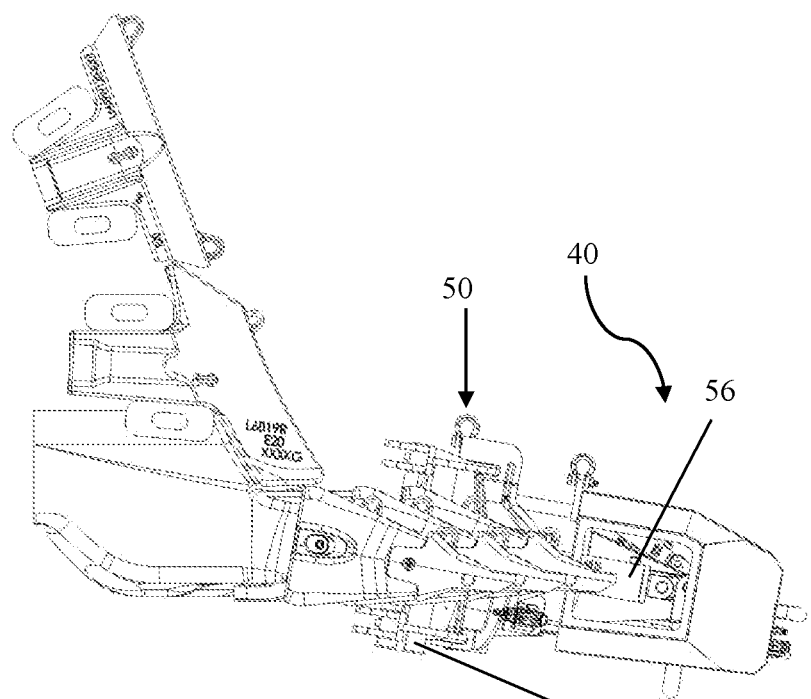
FIG. 15 is a left view of the device of FIG. 1.

Once the gripping portions 94 have engaged the recesses 96, the first actuator 56 is activated so that it moves from the second position towards the third position, thereby moving the bracing bars 52 from the first position to the second position, as shown in FIG. 15. The movement of the gripper 50 moves the roller 88 through the distal opening 92 and out of the curved slot 86.

Figure 16:
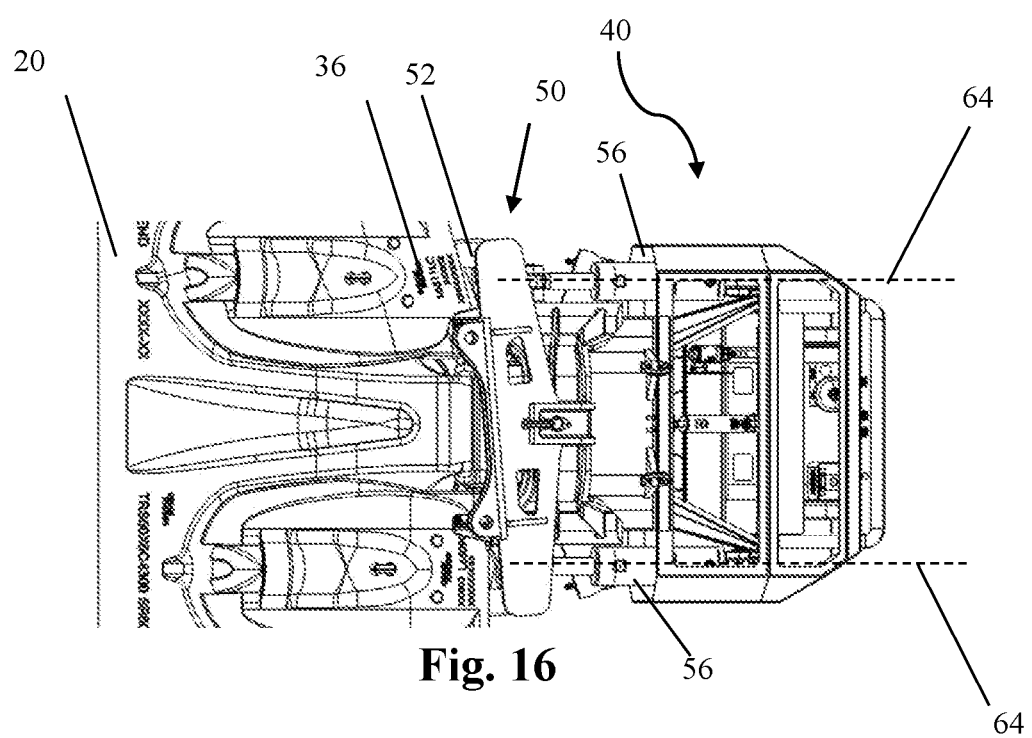
FIG. 16 is a top view of the device of FIG. 1.

The movement of the first actuator 56 is resisted by the bucket lip 20, or the shroud 36 secured to the bucket lip 20, when the bracing bars 52 abut the bucket lip 20, or the shroud 36 secured to the bucket lip 20, as shown in FIG. 16. In the second embodiment, shown in FIGS. 32 to 34, the movement of the first actuator 56 is resisted, at one end, by the bucket lip 20, or the shroud 36 secured to the bucket lip 20. At another end, the movement of the first actuator 56 is resisted by the side 106 when the spacer 102 abuts the side 106.

Figure 17:
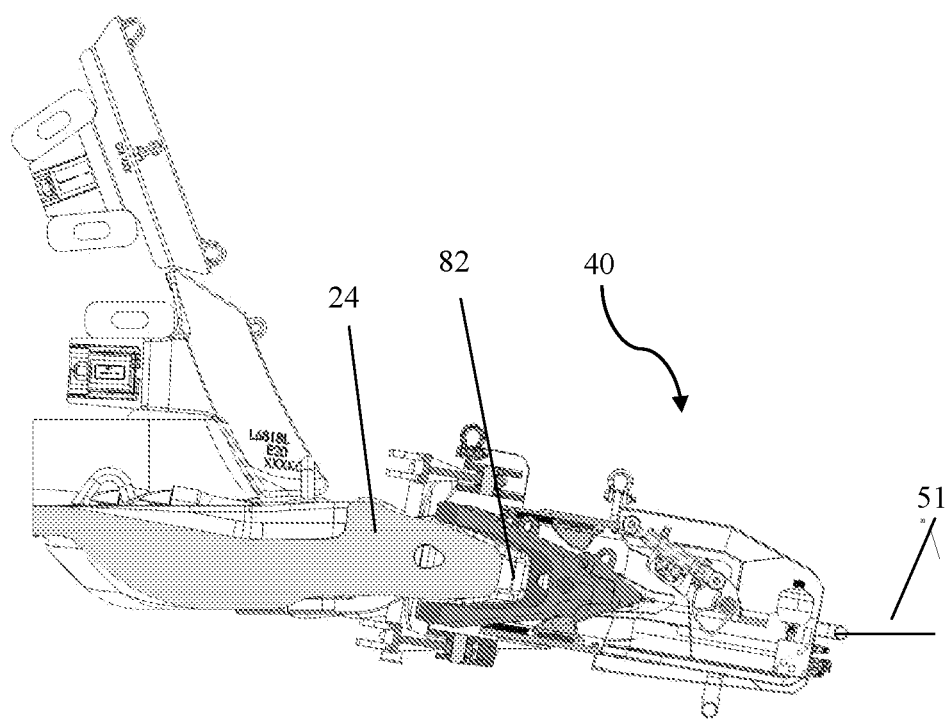
FIG. 17 is a left section view of the device of FIG. 1.
Figure 18:
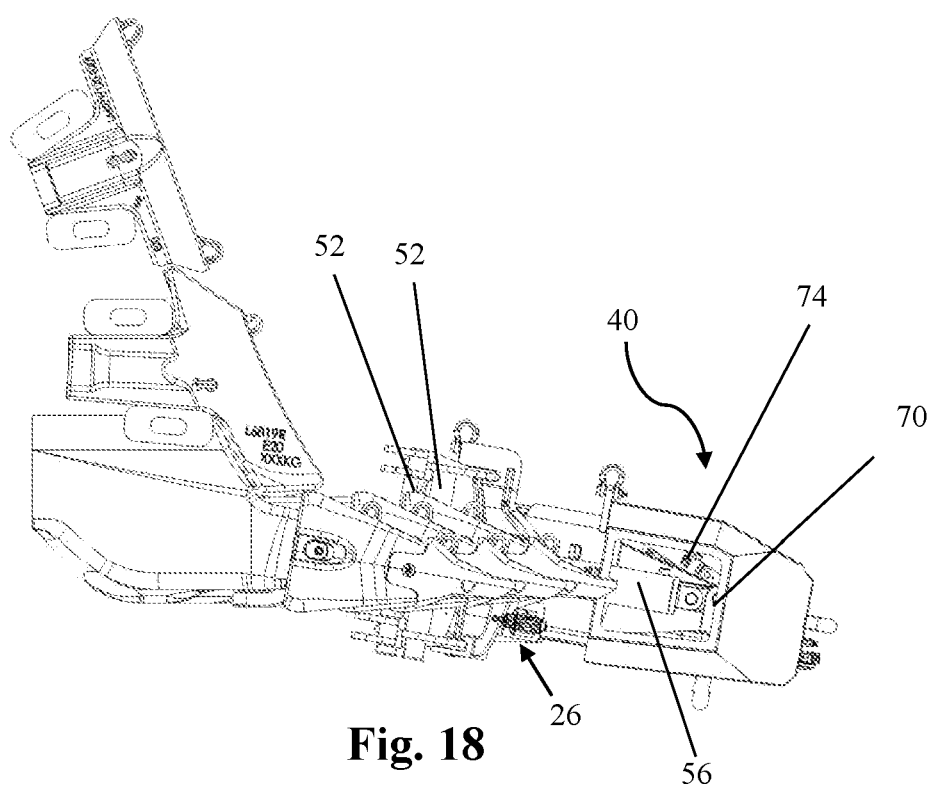
FIG. 18 is a left view of the device of FIG. 1.
Figure 19:
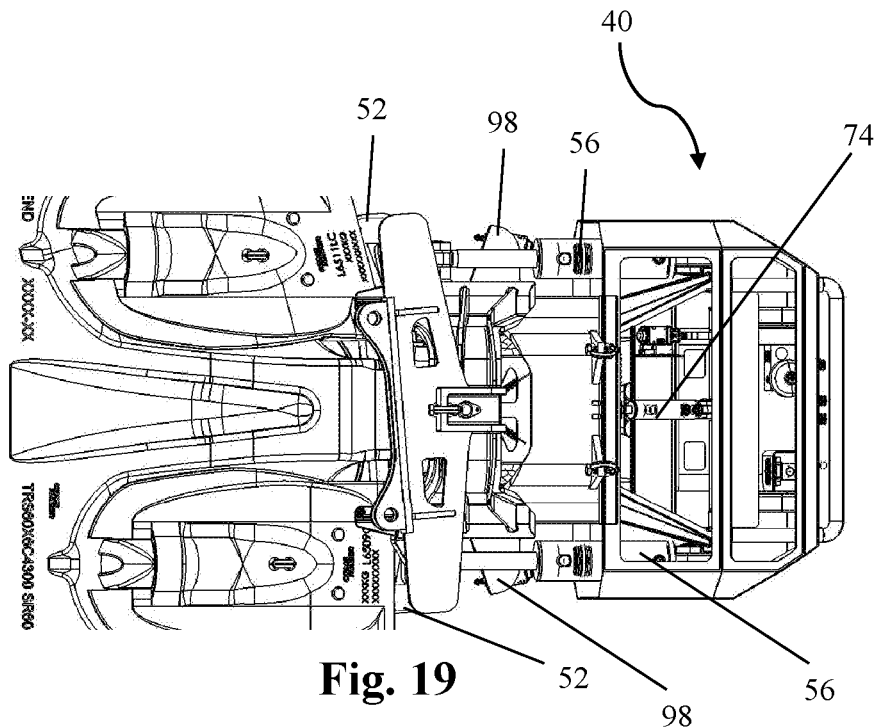
FIG. 19 is a top view of the device of FIG. 1.

When the movement of the first actuator 56 is resisted, the arms 82 transfer the expansive force generated by the first actuator 56 to the recesses 96 of the wear member 26, thereby urging the wear member 26 away from the nose 24, as shown in FIG. 17.

Figure 20:
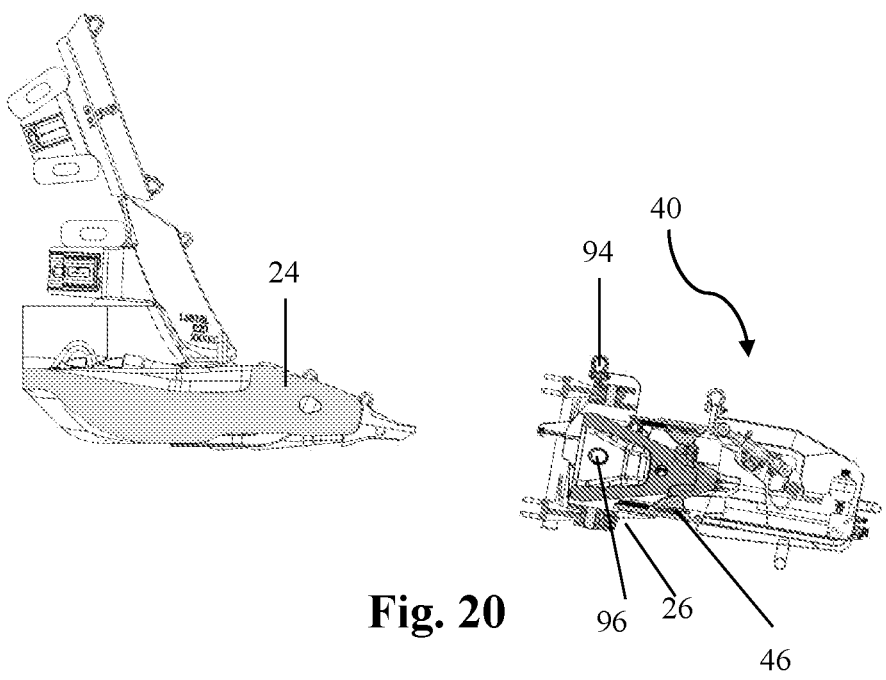
FIG. 20 is a left section view of the device of FIG. 1.
Figure 21:
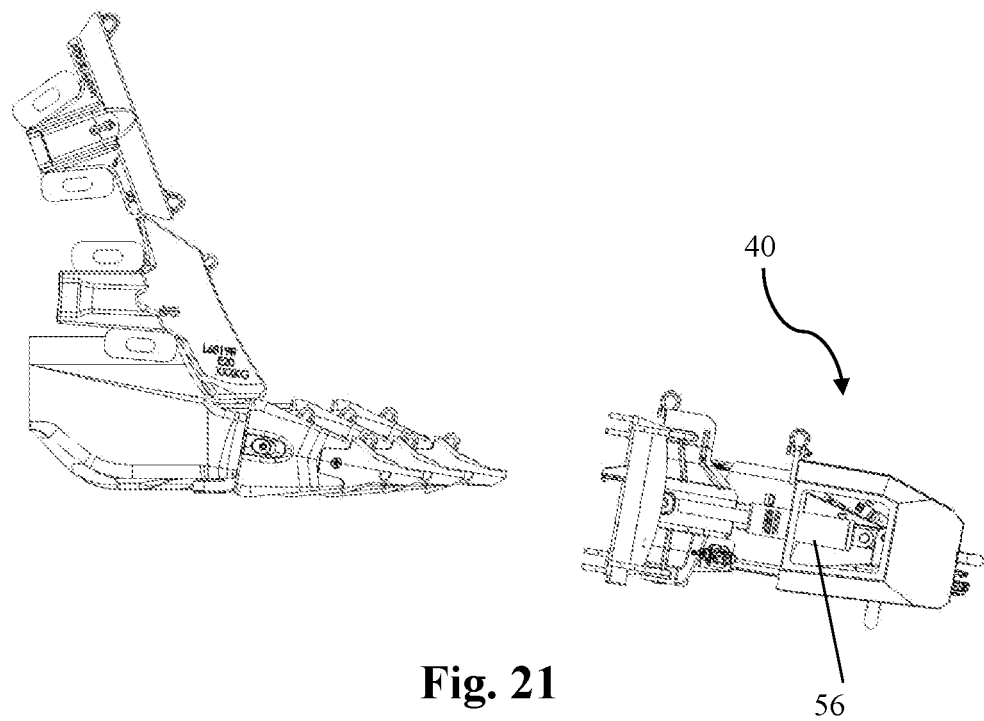
FIG. 21 is a left view of the device of FIG. 1.
Figure 22:
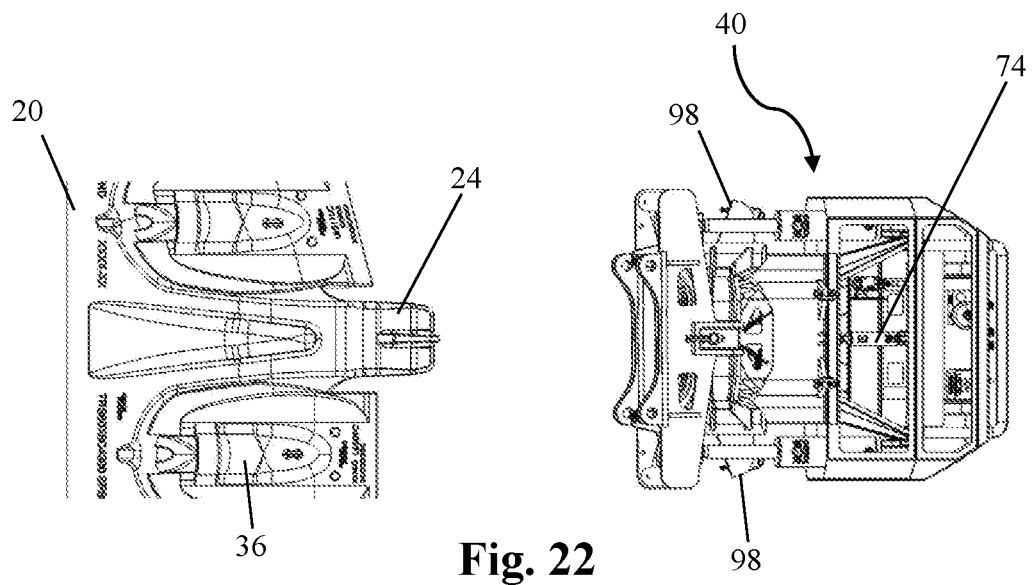
FIG. 22 is a top view of the device of FIG. 1.
Figure 23:
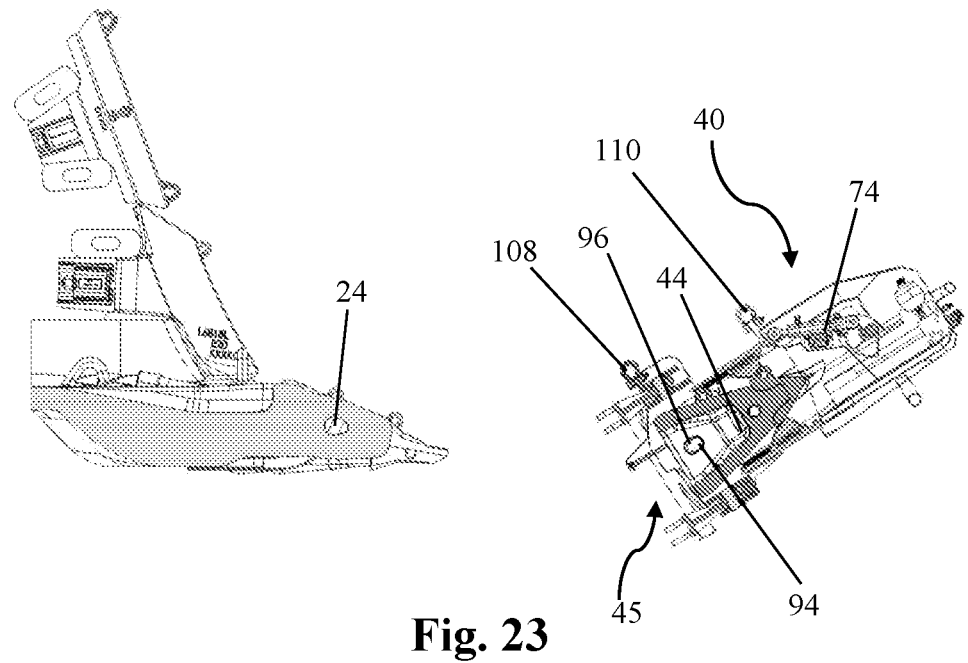
FIG. 23 is a left section view of the device of FIG. 1.
Figure 24:
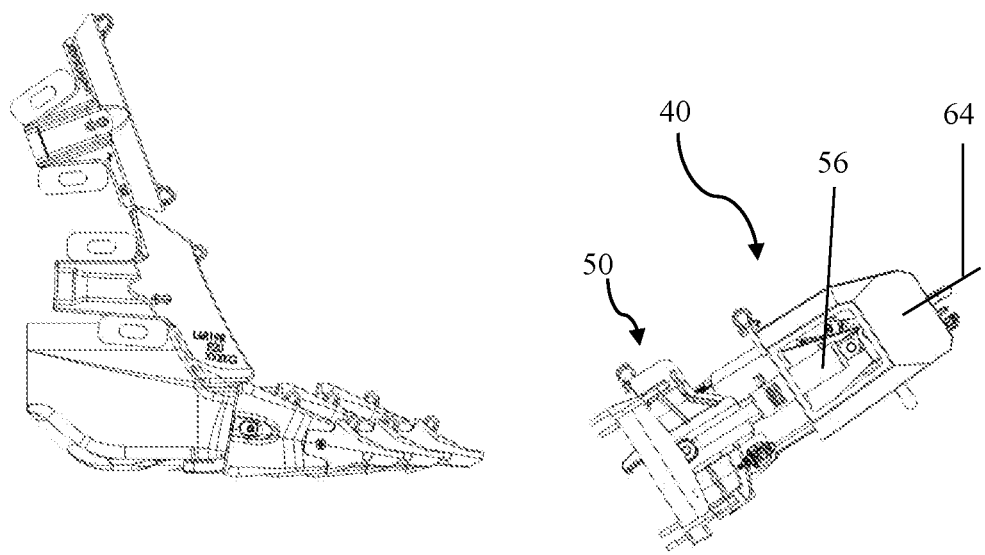
FIG. 24 is a left view of the device of FIG. 1.
Figure 25:
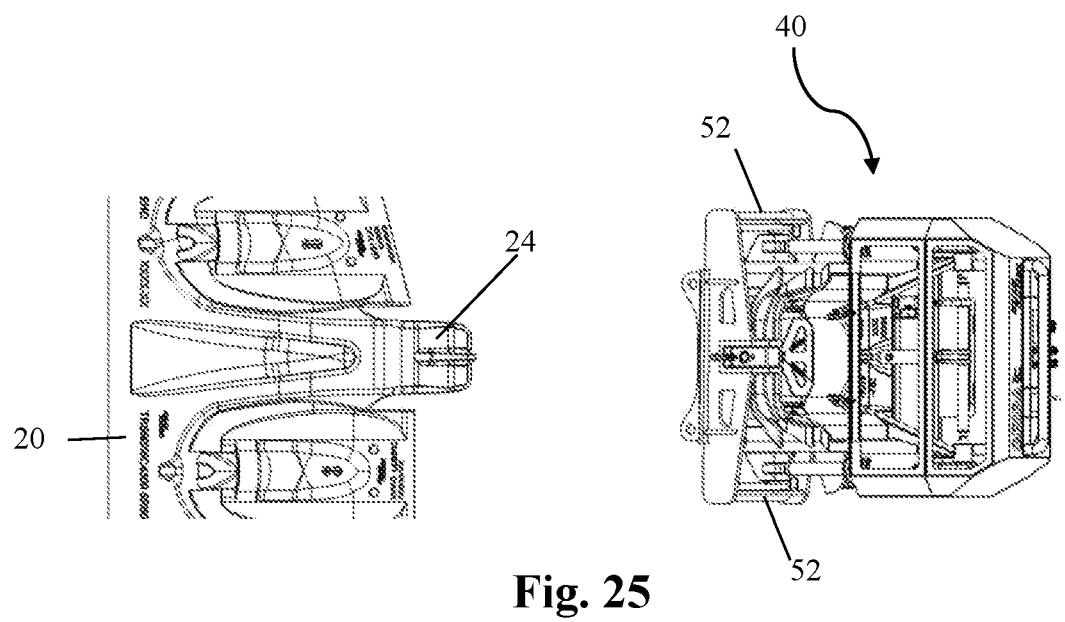
FIG. 25 is a top view of the device of FIG. 1.
Figure 26:
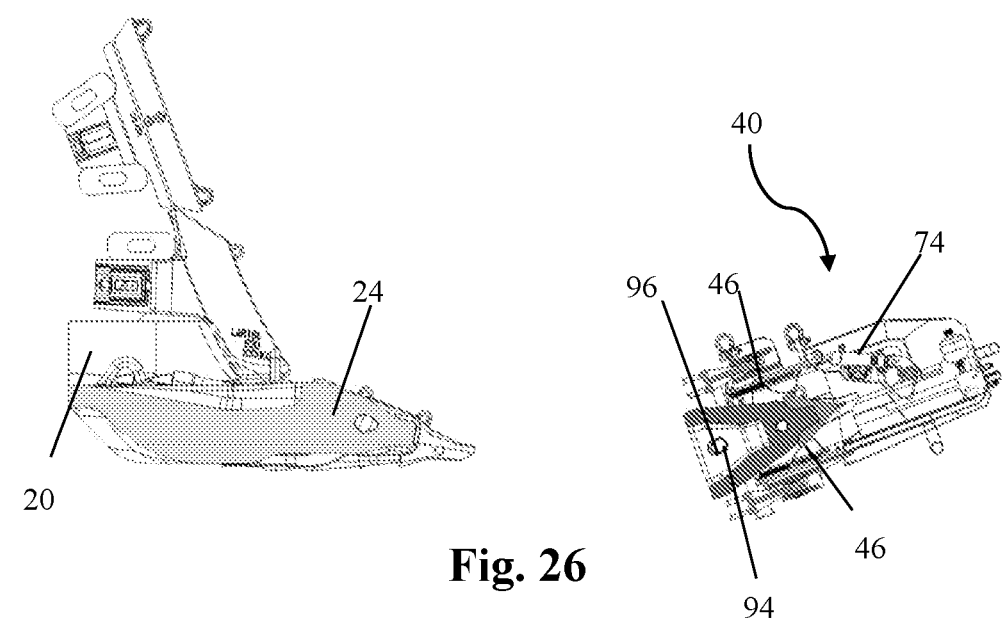
FIG. 26 is a left section view of the device of FIG. 1.

When the first actuator 56 has moved to the third position, thus being fully expanded, the wear member 26 is fully removed from the nose 24. The device 40, carrying the wear member 26 with the resilient members 46 within the cavity 44 and the gripping portions 94 in the recesses 96, is then moved away from the nose 24, as shown in FIG. 20. The device 40 is subsequently tilted so that the opening 45 of the cavity 44 points towards a safe disposal surface (not shown), such as the ground, as shown in FIG. 23. The tilting of the device 40 is achieved by suspending the device 40 using only the second shackle 110 that is rearward of the gravitational center of the device 40 and disconnecting the first shackle 108.

Figure 27:
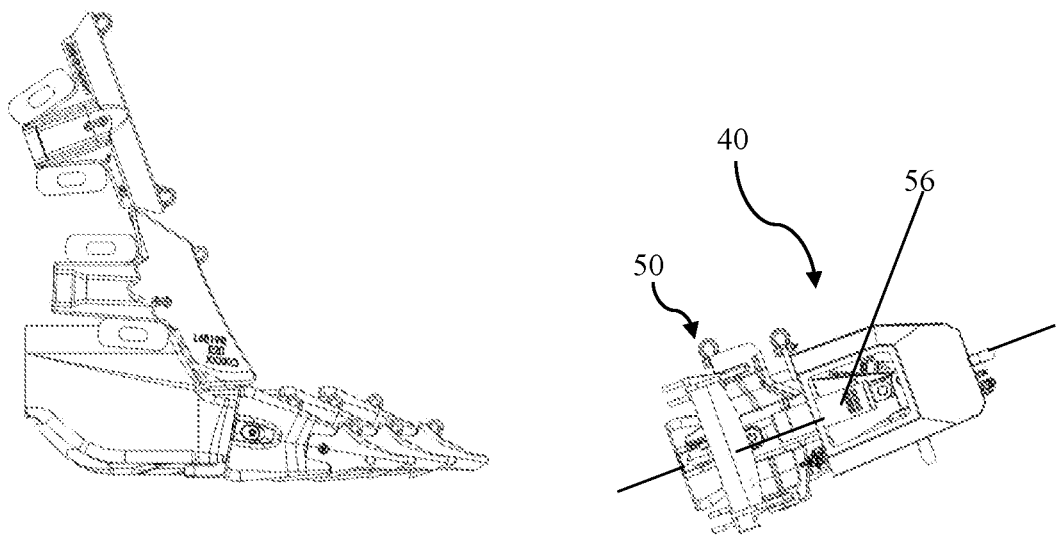
FIG. 27 is a left view of the device of FIG. 1.
Figure 28:
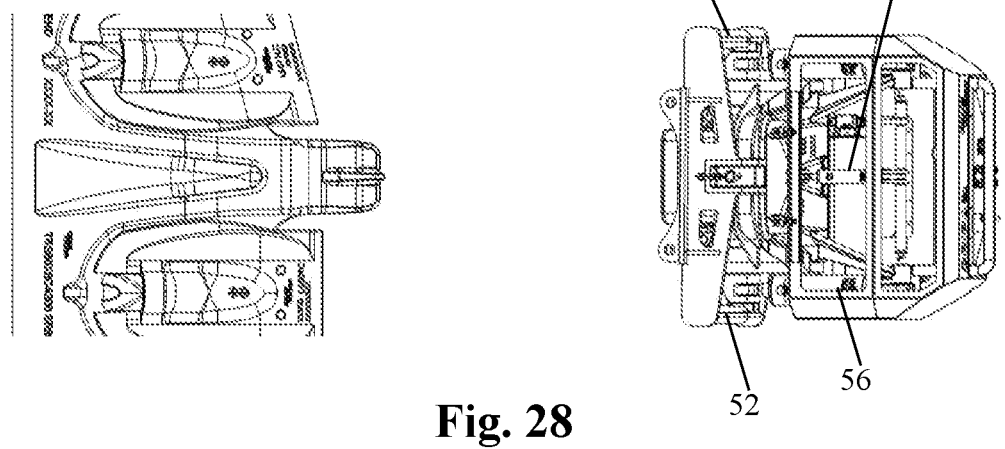
FIG. 28 is a top view of the device of FIG. 1.
Figure 29:
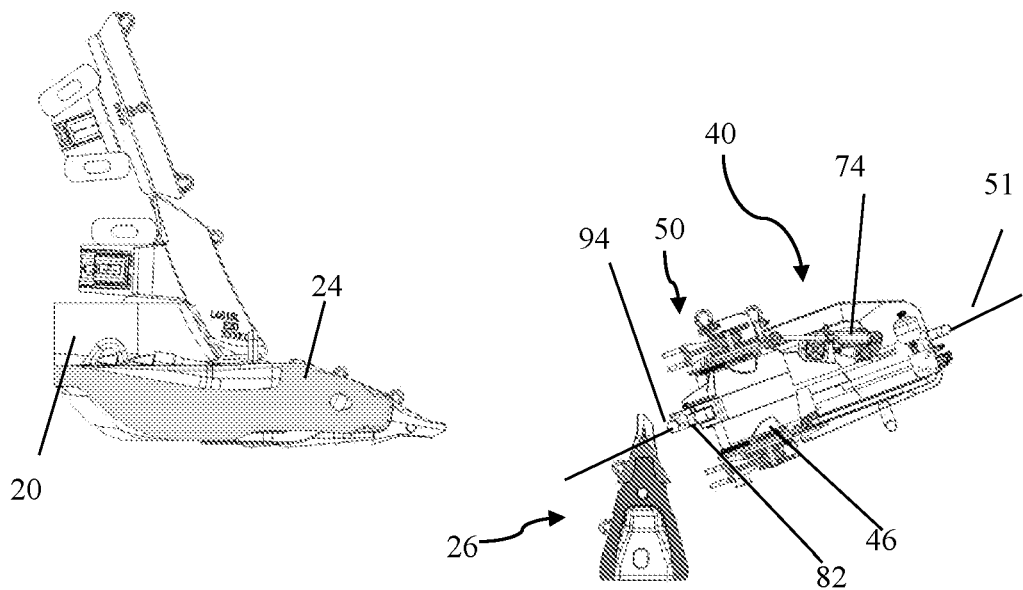
FIG. 29 is a left section view of the device of FIG. 1.
Figure 30:
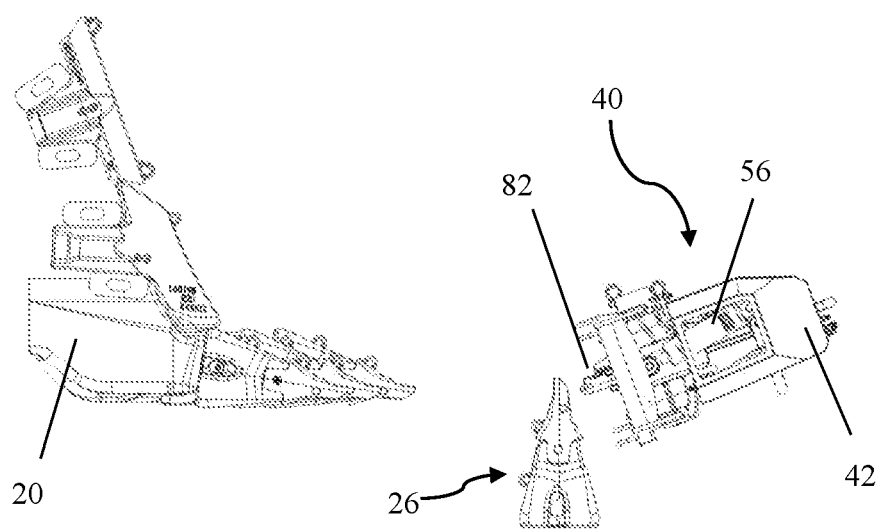
FIG. 30 is a left view of the device of FIG. 1.
Figure 31:
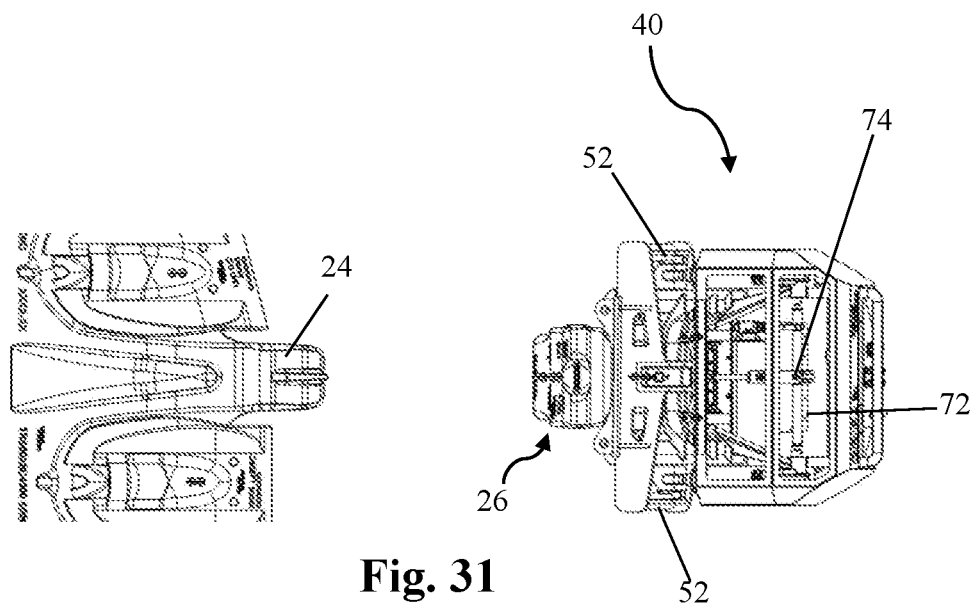
FIG. 31 is a top view of the device of FIG. 1.

The first actuator 56 is then activated again to move from the third position to the second position, as shown in FIG. 27. As the gripper 50 moves along the gripper axis 51, the roller 88 is received within the curved slot 86 by moving through the distal opening 92. The second actuator 74 is then activated to move the shaft 74 from the second position to the first position, thereby moving the first actuator 56 from the second position to the first position, as shown in FIG. 29.

The movement of the first actuator 56 from the second position to the first position moves the gripper 50 along the gripper axis 51, thereby moving the roller 88 along the curved slot 86. The movement of the roller 88 along the curved slot 86 moves the arms 82 from the engaged position to the open position, removing the gripping portions 94 from the recesses 96.

Figure 6:
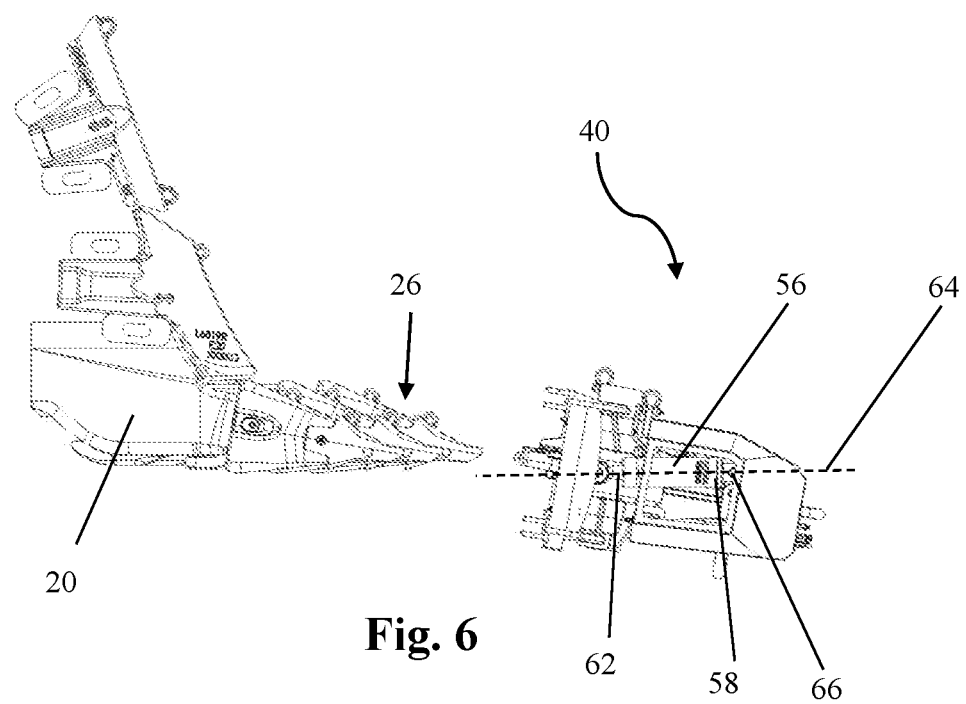
FIG. 6 is a left view of the device of FIG. 1.

The wear member 26 may have fallen from the cavity 44 to the safe disposal surface, or the wear member 26 may still be weakly retained in the cavity 44 by the resilient members 46, requiring negligible manual intervention to remove the wear member 26 from the cavity 44. The device 40 is then tilted to the state shown in FIG. 6 and is ready to remove a further wear member 26. Tilting of the device 40 back to this state is achieved by reconnecting the first shackle 108, in addition to the second shackle 110 to revert the device 40 to the state shown in FIG. 5.

Advantages of the device 40 will now be discussed.

The device 40 removes, or at least reduces, the requirement for hammers or percussion tools for the removal of the wear member 26 from the nose 24 by providing the expansive force between the bucket lip 20 and the wear member 26.

The device 40 reduces the amount of human interaction involved with the removal of a wear member 26. The device 40 is positioned and the second actuator 74 is activated by the operator. Once the arms 82 are engaged with the wear member 26, the operator can move to within a safe working distance and activates the first actuator 56. A remote control (not shown) is used for activating the actuator 56 at the safe working distance. The use of the device 40 ensures that the risk to the operator during the removal process of the wear member 26 is significantly reduced. The device 40 may also be adapted to remove the wear member 26 from the bucket lip 20 "autonomously", i.e. with no direct human interaction with the wear member 26.

The bias of the resilient member 46 accommodates a variety of geometries and thus allows the tooth 28 alone, or the adapter 30 and the tooth 28, or single-piece tooth 28, to be received in the cavity 44. Thus, the device 40 is able to remove the tooth 28 alone, or the adapter 30 and the tooth 28 together or a single piece tooth.

The control of the first and second actuator 56, 74 with the controller allows the implementation of safety protocols that prevent the arms 82 from unintentionally moving from the engaged position, thereby preventing the wear member 26 from inadvertently dislodging from within the cavity 44.

The positioning of the springs 47 away from the opening 45 protects the springs from crushing and decreases frictional wear.

The user of the spacer 102 allows the removal of wear members 26 located at the edge of the bucket lip 20.

The use of the device 40 with existing cranes, or similar equipment, and the provision of pneumatic, hydraulic, and/ or electric power from existing cranes, allows retro-fitting of the device 40 on existing equipment.

| Reference Numerals | |
|---|---|
| 20 | bucket lip |
| 22 | excavator |
| 24 | noses |
| 26 | wear member |
| 28 | tooth |
| 30 | adapter |
| 32 | tooth retainer |
| 34 | retainer |
| 36 | shroud |
| 40 | device |
| 42 | body |
| 44 | cavity |
| 45 | opening |
| 46 | resilient member |
| 47 | springs |
| 48 | guide structure |
| 50 | gripper |
| 51 | gripper axis |
| 52 | bracing bars |
| 54 | bracing bar pin |
| 56 | first actuator |
| 58 | proximal end |
| 60 | pivoting linkage |
| 62 | distal end |
| 64 | first actuator axis |
| 66 | first actuator pin |
| 68 | strut |
| 69 | clamp pin |
| 70 | clamp |
| 71a | pin axis (actuator pin) |
| 71b | pin axis (first lever arm) |
| 72 | shaft |
| 74 | second actuator |
| 76 | first end |
| 78 | second end |
| 80 | second lever arm |
| 82 | arm |
| 84 | arm pin |
| 86 | curved slot |
| 88 | roller |
| 90 | roller pin |
| 92 | distal opening |
| 94 | gripping portion |
| 96 | recess |
| 98 | first sensor |
| 100 | second sensor |
| 102 | spacer |
| 104 | spacer pin |
| 106 | side of bucket lip |
| 108 | first shackle |
| 110 | second shackle |

The invention claimed is:

1. A device for removing a wear member from a ground engaging surface, the device comprising: a body having a cavity and a wear member engaging portion to engage the wear member when the wear member extends into the cavity, the wear member engaging portion being movable between an open position to allow movement of the wear member into the cavity, and an engaged position to engage a recess in the wear member when the wear member extends into the cavity; a gripper movable relative to the body, the gripper having a bracing member adapted to bear against a portion of the ground engaging surface to thereby provide a load path from the ground engaging surface to the wear member engaging portion; and a first actuator connected to the gripper and the body, to apply a force to the gripper, to urge the gripper to move relative to the body, such that, when the bracing member bears against the ground engaging surface, movement of the gripper relative to the body removes the wear member from the ground engaging surface; wherein the movement of the gripper relative to the body between a first position and a second position causes the wear member engaging portion to move between the open position and the engaged position, respectively.

2. The device according to claim 1, wherein the device further includes a second actuator connected between the body and the first actuator to move the gripper between the first position and the second position, and the first actuator is adapted to move the gripper between the second position and a third position, thereby, if the wear member is engaged by the wear member engaging portion, removing the wear member from the ground engaging surface.

3. The device according to claim 2, wherein the second actuator moves the first actuator to move the gripper relative to the body.

4. The device according to claim 1, wherein the bracing member includes a spacer adapted to bear against a side of the ground engaging surface.

5. The device according to claim 3, wherein the side is generally perpendicular to the portion of the ground engaging surface.

6. The device according to claim 1, wherein the device is suspended from a crane, the crane being located on a utility vehicle, the utility vehicle further having a power supply;
wherein the first actuator and/or a second actuator are powered by the power supply.

7. The device according to claim 6, wherein the power supply is a portable hydraulic power supply.

8. The device according to claim 1, wherein the body further includes a damping member located in the cavity to receive the wear member.

9. The device according to claim 8, wherein the damping member is a resilient member biased towards the gripper.

10. The device according to claim 9, wherein the resilient member is biased towards the gripper by a spring between the resilient member and the body.

11. The device according to claim 10, wherein the spring extends from the resilient member away from the wear member engaging portion towards the body.

12. A method of removing a wear member using the device of claim 1.

* * * * *